US012256168B2

(12) United States Patent
Schmitt et al.

(10) Patent No.: US 12,256,168 B2
(45) Date of Patent: Mar. 18, 2025

(54) OPTOELECTRONIC IMAGE SENSOR THAT USES PROJECTIVE TRANSFORMATION

(71) Applicant: Leica Camera AG, Wetzlar (DE)

(72) Inventors: Sylvia Schmitt, Wetzlar (DE); Patrick Theis, Giesen (DE)

(73) Assignee: Leica Camera AG, Wetzlar (DE)

( * ) Notice: Subject to any disclaimer, the term of this patent is extended or adjusted under 35 U.S.C. 154(b) by 77 days.

(21) Appl. No.: 18/029,420

(22) PCT Filed: Oct. 8, 2021

(86) PCT No.: PCT/EP2021/077842
§ 371 (c)(1),
(2) Date: Mar. 30, 2023

(87) PCT Pub. No.: WO2022/074186
PCT Pub. Date: Apr. 14, 2022

(65) Prior Publication Data
US 2023/0370562 A1 Nov. 16, 2023

(30) Foreign Application Priority Data
Oct. 8, 2020 (DE) ..................... 10 2020 126 407.0

(51) Int. Cl.
*H04N 5/262* (2006.01)
*G06T 7/13* (2017.01)
(Continued)

(52) U.S. Cl.
CPC ............. *H04N 5/2628* (2013.01); *G06T 7/13* (2017.01); *G06T 7/60* (2013.01); *H04N 5/272* (2013.01);
(Continued)

(58) Field of Classification Search
CPC .... H04N 5/2628; H04N 5/272; H04N 23/631; H04N 23/635; H04N 23/80; H04N 1/387;
(Continued)

(56) References Cited

U.S. PATENT DOCUMENTS 8,749,647 B2    6/2014  Harikae et al.
9,565,364 B2    2/2017  Chen et al.
(Continued)

FOREIGN PATENT DOCUMENTS

DE    10 2006 018 591 A1    10/2007
DE    10 2015 008 809 A1    1/2017
(Continued)

OTHER PUBLICATIONS

German Search Report dated May 25, 2021 in related German application No. 10 2020 126.407.0 (four pages).
(Continued)

*Primary Examiner* — Mekonnen D Dagnew
(74) *Attorney, Agent, or Firm* — Kilpatrick Townsend & Stockton LLP

(57) ABSTRACT

Disclosed is an image recording device, wherein the image sensor acquires an image data set onto an image area of the image sensor. The position sensor detects a spatial position of the image area relative to a reference direction and provides position data that specify both an angle of rotation and a tilt angle of the image sensor. The evaluation unit determines, from the position data, a projective transformation that maps the image data set onto a projection plane, which is tilted with respect to the image area, in dependence on both the rotation and the tilt. The evaluation unit determines an image section in the projection plane for the image data set mapped onto the projection plane by a projective transformation and displays the image section with at least
(Continued)

Figure 1:
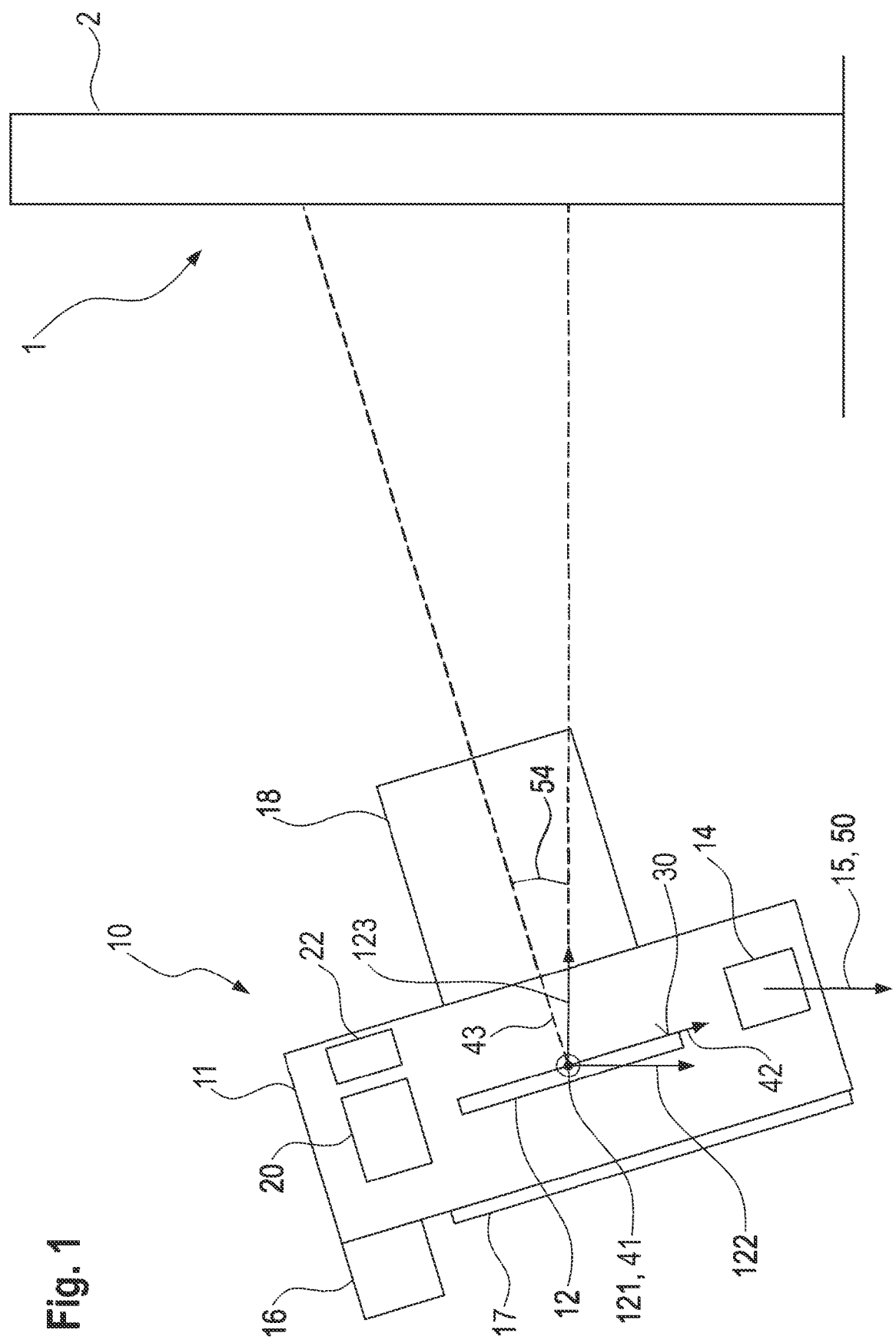

a region of the imaged scene that lies within the image section in the graphical user output interface.

20 Claims, 22 Drawing Sheets

(51) Int. Cl.
*G06T 7/60* (2017.01)
*H04N 5/272* (2006.01)
*H04N 23/63* (2023.01)

(52) U.S. Cl.
CPC ......... *H04N 23/631* (2023.01); *H04N 23/635* (2023.01); *G06T 2200/24* (2013.01); *G06T 2207/10016* (2013.01); *G06T 2207/20092* (2013.01)

(58) Field of Classification Search
CPC ......... G06T 7/13; G06T 7/60; G06T 2200/24; G06T 2207/10016; G06T 2207/20092; G06T 5/80
See application file for complete search history.

(56) References Cited

U.S. PATENT DOCUMENTS

| | | | |
|---|---|---|---|
| 9,729,787 B2 | 8/2017 | Shechtman et al. | |
| 9,992,472 B1* | 6/2018 | Cutu | H04N 13/106 |
| 2007/0070207 A1 | 3/2007 | Sakurai | |
| 2009/0278975 A1 | 11/2009 | Grosspietsch | |
| 2010/0141775 A1 | 6/2010 | Vogel | |
| 2015/0181096 A1 | 6/2015 | Kasai et al. | |
| 2015/0244938 A1 | 8/2015 | Petrakis et al. | |
| 2016/0112652 A1 | 4/2016 | David et al. | |
| 2017/0115497 A1* | 4/2017 | Chen | H04N 13/207 |
| 2017/0135617 A1* | 5/2017 | Alasirniö | G01S 17/48 |
| 2017/0180618 A1 | 6/2017 | Georgiev et al. | |
| 2017/0208207 A1 | 7/2017 | Liu et al. | |
| 2024/0177346 A1* | 5/2024 | Omlor | G06T 5/90 |

FOREIGN PATENT DOCUMENTS

| | | |
|---|---|---|
| EP | 1 768 387 A1 | 3/2007 |
| EP | 1 906 655 A1 | 4/2007 |
| EP | 2 667 350 B1 | 11/2018 |
| JP | 2001-084365 A | 3/2001 |
| JP | 2017-162313 A | 9/2017 |
| WO | 01/82592 A1 | 11/2001 |
| WO | 2015/016955 A1 | 2/2015 |

OTHER PUBLICATIONS

International Search Report (ISR) mailed Jan. 4, 2022 in related International Application No. PCT/EP2021/077842 (six pages).
Communication under Article 94(3) in related European Application No. 21 789 730.5 dated Dec. 11, 2024; seven pages.

* cited by examiner

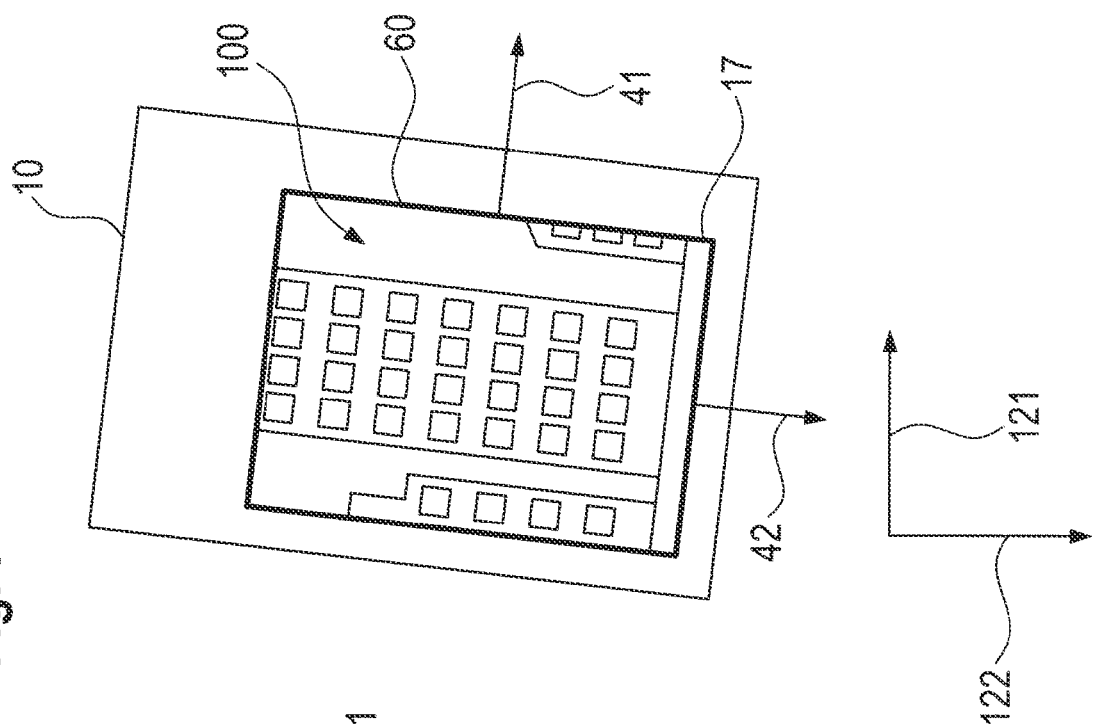
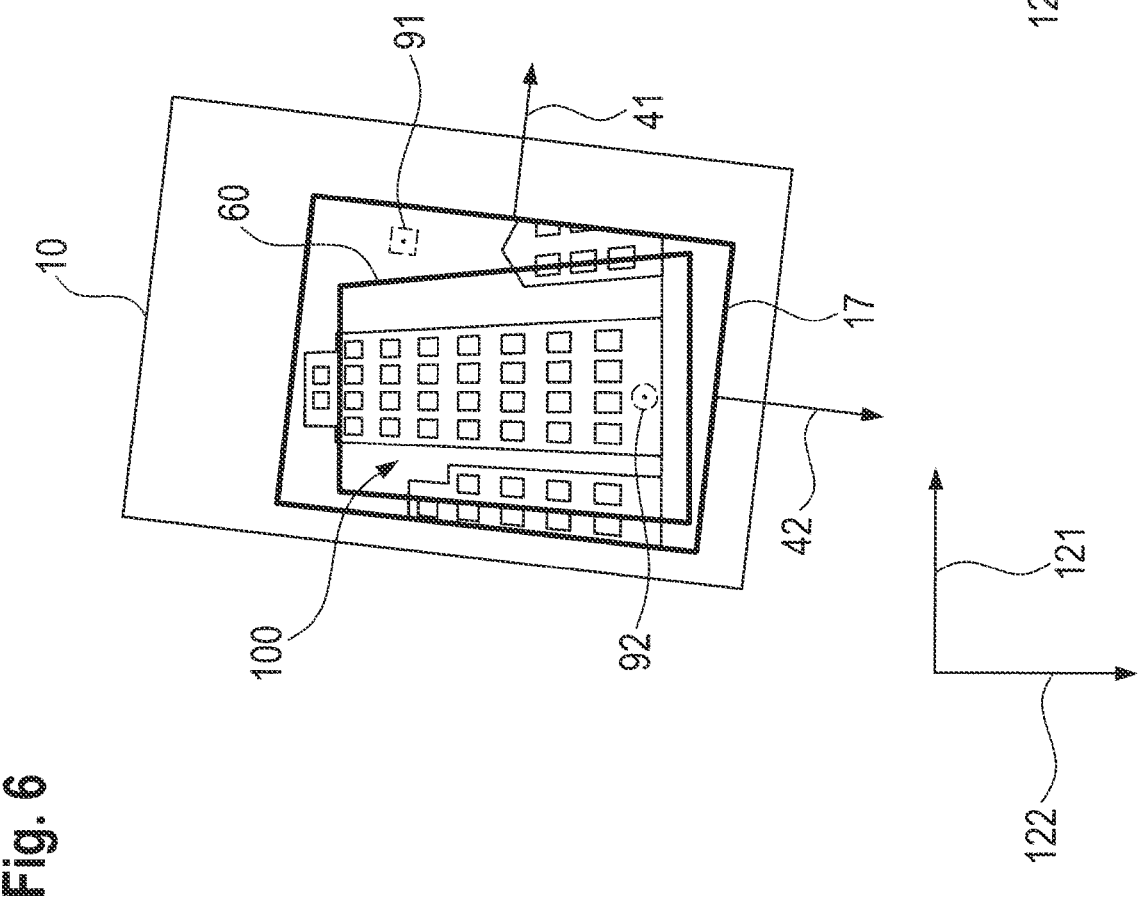

OPTOELECTRONIC IMAGE SENSOR THAT USES PROJECTIVE TRANSFORMATION

This application is a U.S. National Phase Application of PCT/EP2021/077842, filed Oct. 8, 2021, which claims the priority of German Patent Application 10 2020 126 407.0, filed Oct. 8, 2020, the entireties of which are incorporated by reference herein.

The present invention relates to an image recording device comprising an optoelectronic image sensor and to a method of operating an image recording device comprising an optoelectronic image sensor.

Image recording devices comprising optoelectronic image sensors, for example photo or video cameras, image a scene located in front of the image recording device onto an image area of the image sensor and generate image data that represent the scene imaged onto the image area. During the imaging of the scene, it can occur on a tilting of the image area with respect to a reference area of the scene, for example with respect to a vertical plane of a house front, that the reference area of the scene is not aligned in parallel with the image area of the image sensor. Different regions within the reference area of the scene thereby have different spacings from the image area of the image sensor and the different regions are imaged onto the image area with different increases in size. This leads to perspective distortions of the scene imaged onto the image area. As a result, straight lines that extend in parallel with one another within the reference plane can, for example, be imaged as so-called plunging lines, which can in particular occur when imaging tall buildings from a low-lying viewpoint.

The perspective distortions resulting from a tilting of the image recording device can be reversed during a subsequent processing of the image data by an inverse transformation that compensates the perspective distortion occurring during the recording of the image data. In this respect, straight lines are typically identified within the image data that extend in parallel with one another in the original scene, and the image data are subsequently corrected by means of the inverse transformation such that the identified straight lines are also aligned in parallel in the recorded scene.

In the inverse transformation, the margins of the image data are, however, also distorted so the transformed image data have to be cropped to avoid skewed margins. The usable image section is thereby reduced. In a subsequent processing of already recorded image data, this can have the result that image regions that were present in the original recording and that are important for the composition of the image have to be cropped and can no longer be used.

It is the object of the invention to enable a user of an image recording device to easily generate image data that still include all the image regions that are relevant for the composition of the recording even after a correction of a perspective distortion occurring during the recording.

This object is satisfied by an image recording device and a method of operating an image recording device in accordance with the independent claims. Further developments are respectively specified in the dependent claims.

An image recording device has an optoelectronic image sensor, a position sensor, a graphical user output interface, and an evaluation unit. The image sensor is configured to acquire an image data set that represents an imaging of a scene located in front of the image sensor onto an image area of the image sensor. Furthermore, the position sensor is configured to detect a spatial position of the image area relative to a reference direction and to provide position data that specify both an angle of rotation, by which the image area is rotated about an optical axis of the image sensor on the acquisition of the image data set, in particular with respect to a perpendicular projection of the reference direction onto the image area, and a tilt angle by which the image area is tilted about a horizontal axis, in particular with respect to the reference direction, on the acquisition of the image data set. In this respect, the horizontal axis is oriented perpendicular to the optical axis and perpendicular to the reference direction. The evaluation unit is configured to determine, from the position data, a projective transformation that maps the image data set onto a projection plane in dependence on both the rotation and the tilt from the image area. The projection plane is in this respect tilted with respect to the image area in dependence on the tilt angle and intersects the image area along an intersection line that is rotated in the image area with respect to center axes of the image area in dependence on the angle of rotation. The evaluation unit is furthermore configured to determine an image section in the projection plane for the image data set mapped onto the projection plane by means of the projective transformation and to display the image section with at least a region of the scene imaged onto the image area that lies within the image section in the graphical user output interface.

Within the framework of the invention, it was recognized that a simple and, above all, a perspectively correct correction of perspective distortions is made possible in that the position of the image sensor relative to the recorded scene is automatically detected via the position sensor and a projective transformation for compensating the perspective distortions is calculated from the position data of the position sensor. Since not only the tilt of the image sensor about the horizontal axis, i.e. a tilt of an image plane of the image sensor with respect to a reference plane of the scene aligned in parallel with the reference direction, but also the rotation of the image sensor about the optical axis is taken into account in the projective transformation, a perspectively correct correction of the imaged scene in particular also still takes place when the image sensor is rotated.

The display of the image section determined by the evaluation unit together with the scene imaged onto the image area in the user output interface of the image recording device then enables a user to already orient the image sensor during the recording of the scene such that even in the case of a subsequent cropping of the image data, all the image regions that are essential for the composition of the recording lie within the image section. In this regard, a user of the image recording device already receives direct feedback during the recording about the image section that can still be used after a correction of the perspective distortion so that the user can already select all the relevant recording parameters while taking into account the image section that will be available later.

The reference direction used for determining the projective transformation can in particular be independent of the rotation and the tilt of the image sensor determined by the position sensor. The absolute spatial position of the projection plane is thereby also independent of the rotation of the image sensor about its optical axis and the tilt of the image sensor about the horizontal axis. Since the horizontal axis is oriented perpendicular to the optical axis and the reference direction, the optical axis is also arranged in a vertical plane, which is spanned by the reference direction and the optical axis and which is oriented perpendicular to the horizontal axis, after applying the projective transformation. In this regard, the direction of view onto the imaged scene also does not shift out of the vertical plane after application of the projective transformation, which facilitates a composition of the image section during the recording of the scene compared to, for example, transformations in which the projection plane always has the same orientation with respect to the image sensor irrespective of a rotation of the image sensor about the optical axis.

The tilt of the projection plane with respect to the image area can in particular depend on the tilt angle in such a way that the tilt of the projection plane with respect to the image area corresponds to the tilt angle or the tilt angle minus a residual angle. The tilt of the projection plane with respect to the image area can in particular depend on the tilt angle in such a way that the projection plane is tilted with respect to the image area at a tilt angle unequal to zero and is aligned in parallel with the image area at a tilt angle equal to zero.

Similarly, the rotation of the intersection line between the image area and the projection plane with respect to the center axes of the image area can depend on the angle of rotation in such a way that the rotation of the intersection line with respect to the center axes corresponds to the angle of rotation. The rotation of the intersection line with respect to the center axes can in particular depend on the angle of rotation in such a way that the intersection line does not extend in parallel with the center axes at an angle of rotation not equal to zero and extends in parallel with a center axis of the image area at an angle of rotation equal to zero. In a rectangular image area, the intersection line then also does not extend in parallel with a margin of the image area at an angle of rotation different from zero.

The position sensor can be configured as a triaxial sensor that determines the spatial position of three mutually orthogonal axes of the image sensor. The position sensor can be arranged in a stationary manner together with the image sensor within a common housing. The position sensor can, for example, be configured as a gravity sensor or as a gyroscopic sensor. Alternatively, the reference direction can also be predefinable by a user input, for example, by an orientation of a center axis of the image sensor along the desired reference direction and a calibration of the position determination to the corresponding spatial position, for instance, as a reaction to a user input.

The reference direction used when determining the spatial position of the image sensor can be a fixedly predefined direction, for example, the direction of the gravitational acceleration. If it is the gravitational acceleration, the horizontal axis is in particular aligned in parallel with the horizon of the recorded scene so that the tilt angle specifies the tilt of the image area from its vertical orientation.

To also ensure an unambiguous definition of the position of the horizontal axis in cases in which the reference direction is aligned in parallel with the optical axis, the evaluation unit can be configured to determine the horizontal axis as a direction oriented perpendicular to the reference direction and perpendicular to the optical axis only when the tilt angle corresponds at most to a predefined limit value. In this respect, the limit value can be less than 90°, for example, less than 45°. The limit value can, for example, be 1°, 3°, 5° or 10° less than 90° or 45°.

Furthermore, the evaluation unit can be configured to determine the projective transformation and the image section only for tilt angles that correspond at most to the predefined limit value. Alternatively, the evaluation unit can also be configured to align the horizontal axis in parallel with a predefined center axis of the image area when the predefined limit value is exceeded.

The image recording device can be configured as a photographic camera or a video camera. The image recording device can in particular be configured as a mirrorless camera. To image the scene onto the image area of the image sensor, the image recording device can have an imaging optics, for example a lens, that is connected in a stationary manner to the image sensor and the position sensor during the imaging, for instance, to a housing comprising the image sensor and the position sensor. The imaging optics can in particular be an interchangeable lens. An optical axis of the imaging optics can coincide with the optical axis of the image sensor.

The user output interface can be an electronic or optical viewfinder of the image recording device or a screen. If it is an optical viewfinder, the image section can be displayed superposed on the region of the imaged scene shown within the viewfinder to simultaneously display the image section and at least the region of the imaged scene that lies within the image section in the user output interface configured as a viewfinder. The screen and/or the viewfinder can likewise be arranged at the housing comprising the image sensor and the position sensor. Alternatively, at least the screen can be arranged remotely from such a housing, for example, in a mobile device, for instance a smartphone or a tablet computer, connected to the image sensor and the position sensor via a data link.

The evaluation unit can comprise at least one programmable logic unit, for example, an ASIC, an FPGA, a microchip or the like. It can be arranged in the same housing as the image sensor and the position sensor. Alternatively, at least components of the evaluation unit can be arranged outside this housing, for example, in an external processing unit of the image recording device, for instance the smartphone or tablet computer, connected to the housing via a data link.

The image sensor can, for example, be configured as a CCD sensor or a CMOS sensor. The image area of the image sensor is formed by that area of the image sensor that detects incident electromagnetic radiation and converts it into electronic signals to create the image data set. The image area can in particular be rectangular.

The image section can, for example, be determined as a rectangular image section. To determine the image section, the evaluation unit can image at least all the corner points of the image area onto the projection plane by means of the projective transformation. The evaluation unit can in particular only map the corner points of the image area, but not the individual pixels of the image sensor, onto the projection plane to determine the image section. After determining the coordinates of the image section within the projection plane, the evaluation unit can image the coordinates of the image section back onto the image area of the image sensor by means of a transformation inverse to the projective transformation. This makes it possible to display the image section within the untransformed scene in the graphical user output interface. In this respect, the image section and all the image data acquired by the image area of the image sensor can in particular be displayed at the same time.

Alternatively, the untransformed image section can also be directly displayed in the user output interface together with the region of the imaged scene that is likewise mapped onto the projection plane and that lies within the image section. This makes it possible to display the image section obtainable after the correction of the perspective distortion over the full area within the user output interface and thus in a high magnification.

In a further development, the reference direction corresponds to the direction of the gravitational acceleration. The spatial position of the image sensor can thereby be easily determined in an automated manner. Typically, perspective distortions occur when the imaged scene includes tall vertical objects, for example buildings, that are recorded from a low-lying or high-lying viewpoint. In particular in the case of such perspective distortions, the projective transformation can then be determined without a user input. In such a further development, the position sensor can, for example, be configured as an acceleration sensor for detecting the earth's gravitational field.

In a further development, the projection plane is aligned in parallel with the horizontal axis and/or in parallel with the reference direction. If the projection plane is in parallel with the horizontal axis, the rotation of the image area about the optical axis is completely corrected. If the projection plane is in parallel with the reference direction, the tilt of the image area with respect to the reference direction, for example with respect to a vertical orientation determined from the gravitational acceleration, is completely compensated.

Alternatively, the projection plane can enclose a residual angle with the horizontal axis that is different from zero and that is smaller than the angle of rotation so that the rotation about the optical axis is not completely compensated. Alternatively or additionally, the projection plane can enclose a further residual angle with the reference direction that is different from zero and that is smaller than the tilt angle.

The tilt of the image area about the horizontal axis is thereby not completely compensated. In particular in the case of an undercorrection, i.e. an incomplete compensation of the tilt of the image area about the horizontal axis, the imaged scene can appear more natural after applying the perspective correction than in the case of a complete correction of the tilt.

In a further development, the horizontal axis intersects the optical axis at the center of the image area. Thus, the projection plane also intersects the image area at the center of the image area and along the horizontal axis.

In a further development, a projection center of the projective transformation is arranged on the optical axis. This enables a perspectively correct compensation of the perspective distortions occurring during the imaging.

In a further development, a spacing of the projection center from the image area corresponds to a focal length, normalized to a diagonal of the image area, of an imaging optics of the image recording device imaging the scene onto the image sensor. Perspective distortions occurring during the imaging can thereby be completely corrected. If the image recording device is configured to accommodate different imaging optics, for example as interchangeable lenses, the evaluation unit can be configured to determine the spacing of the projection center based on a provided focal length of the imaging optics used during the recording. In this respect, the focal length can, for example, be provided by the imaging optics, for instance by an electronic unit of the imaging optics, and can be detected by the evaluation unit. If the imaging optics is configured to image the recorded scene with an adjustable focal length, for example in the case of imaging optics configured as a zoom lens, the evaluation unit can be configured to detect the focal length set in each case.

In a further development, the evaluation unit is configured to only use corner points of the image area projected onto the projection plane for the determination of the image section. A particularly fast and simple determination of the image section hereby becomes possible. In such a further development of the image recording device, the determination of the image section can in particular take place without a projection of further pixels of the image sensor, in particular without a projection of all the pixels of the image sensor onto the projection plane. The image section can thereby be determined particularly quickly with little computing effort.

In a further development, the evaluation unit is configured to determine the image section based on a predefined aspect ratio. By predefining the aspect ratio, the image section can subsequently be determined in an automated manner. The predefined aspect ratio can, for example, correspond to an aspect ratio of the image area and/or to an aspect ratio of the user output interface. The aspect ratio can, for example, be unchangeably stored in the evaluation unit or can be predefinable by a user of the image recording device via a user input interface.

In a further development, the predefined aspect ratio is, for example, different from an aspect ratio of the image area and/or of the user output interface and the evaluation unit is configured to receive a user input for specifying the predefined aspect ratio via a user input interface. The image section can thereby be automated in a particularly flexible manner.

In a further development, the evaluation unit is configured to determine the image section, for example as a rectangular section, such that, in the projection plane, a first center axis of the image section extends in parallel with the horizontal axis and a second center axis of the image section oriented perpendicular to the first center axis extends in parallel with the reference direction. The image section determined in the projection plane thereby has an orientation that completely corrects the rotation of the image sensor about its optical axis.

In a further development, the evaluation unit is configured to determine the image section such that, when the predefined aspect ratio is maintained, at least two corners of the image section lie on margins of the image area that are mapped onto the projection plane by means of the projective transformation. The image section can thereby be determined as particularly large, in particular as the maximum usable image section while maintaining the predefined aspect ratio.

In a further development, the evaluation unit is configured to determine the image section independently of the position of the image sensor such that a center of the image area projected onto the projection plane by means of the projective transformation lies on a center axis of the image section. This facilitates a symmetrical imaging of the scene. Furthermore, the region of the imaged scene that lies within the image section has particularly few image errors, for example distortions, in such a determination of the image section since image errors caused by the imaging optics usually increase as the spacing from the optical axis increases and thus as the spacing from the center of the image area increases.

In a further development, the evaluation unit is configured to use the same algorithm for determining the image section both for positive tilt angles and for negative tilt angles and to apply the algorithm to the projected image area inverted along the reference direction, instead of to the image area projected into the projection plane, only when a positive tilt angle is present or only when a negative tilt angle is present. Only a small number of case distinctions is thereby required to enable both a correction of positive tilt angles and a correction of negative tilt angles.

For those tilt angles at which the algorithm is applied to the inverted projected image area, i.e. either all the positive tilt angles or all the negative tilt angles, the relevant points of the image area, for example its corner points, can first be mapped onto the projection plane and can subsequently be inverted. After the algorithm has then been applied, the determined image section can likewise be inverted along the reference direction to obtain the position of the image section within the original, non-inverted projected image area.

In a further development, the evaluation unit is configured, at least when the tilt angle is equal to zero, to determine a corner of the image section in the projection plane as a point of intersection of a diagonal of the image section, which diagonal is predefined by the aspect ratio, with a margin of the image area projected onto the projection plane. With such a graphical determination of the image section, the image section can be determined particularly easily and with a low computing power. At a tilt angle equal to zero, the image section determined in this way also corresponds to the maximum possible image section while maintaining the aspect ratio. The diagonals of the image section can in this respect be determined starting from a center of the image section, wherein the center can in particular correspond to the center of the image area transformed onto the projection plane.

In a further development, the evaluation unit is configured, at least when the tilt angle differs from zero by at least a threshold value and the angle of rotation is equal to zero, to determine a corner of the image section in the projection plane as a point of intersection of a diagonal of one half of the image section, which diagonal is predefined by the aspect ratio, with a margin of the image area projected onto the projection plane, wherein, in the projection plane, the diagonal extends through a center of a further margin of the image section aligned in parallel with the horizontal axis. This likewise enables a simple graphical determination of the image section with a low computing power.

The center of the further margin of the image section, which further margin is aligned in parallel with the horizontal axis, can in particular be arranged on a center axis of the image section, which center axis is aligned in parallel with the reference direction and extending through the center of the image area transformed onto the projection plane. The image section can be adjacent to the further margin of the image section, which further margin is aligned in parallel with the horizontal axis. The further margin can in particular be the longest margin of the image section aligned in parallel with the horizontal axis.

The evaluation unit can be configured to determine the image section as the point of intersection of the diagonal of the image section, which diagonal is predefined by the aspect ratio, with the projected margin of the image area only when the tilt angle is equal to zero or less than the threshold value, and to determine the image section as the point of intersection of the diagonal of the half of the image section, which diagonal is predefined by the aspect ratio, with the projected margin of the image area only when the tilt angle is not equal to zero or differs from zero by at least the threshold value and the angle of rotation is equal to zero or differs from zero by at most one further threshold value.

In a further development, the evaluation unit is configured to display the region of the scene imaged onto the image area that lies within the image section in the graphical user output interface as a region of the image data set that is transformed into the projection plane by means of the projective transformation and to display the image section by cropping the transformed image data set, for example, by cropping the transformed image data set by means of margins of the user output interface. The cropped and perspectively rectified region of the imaged scene is thereby directly displayed to a user.

In a further development, the evaluation unit is configured to display the scene imaged onto the image area completely and without applying the projective transformation in the graphical user output interface, wherein the evaluation unit is configured to display the image section by means of a frame superposed on the imaged scene. The scene imaged onto the image area of the image sensor can thereby be completely displayed to a user of the image recording device. When preparing the recording, the user can in particular also consider regions of the scene that lie outside the image section.

If the scene imaged onto the image plane is displayed untransformed, i.e. without applying the projective transformation, in the graphical user output interface, the image section determined in the projection plane can be displayed in the user output interface by applying a transformation inverse to the projective transformation. The frame surrounding the image section can in particular be displayed by applying the inverse transformation. The inverse transformation can, for example, as a further projective transformation project the image section from the projection plane with the projection center lying on the optical axis onto an image plane comprising the image area.

The frame can be displayed in the user output interface by means of individual lines. Further visual display variants can comprise a grayed-out region surrounding the frame or a color representation of the regions lying outside the frame that differs from a color representation inside the frame. Furthermore, the frame can generally also be displayed with superposed grid lines that can be aligned in parallel with and/or orthogonally to margins of the frame.

Such grid lines can be aligned in parallel with and/or orthogonally to the margins of the frame, in particular in the projection plane. In an untransformed display of the imaged scene in the user output interface, both the frame and the grid lines can then be displayed transformed onto the image plane by means of the inverse transformation.

In a further development, the evaluation unit is configured to display a position of a measurement point for determining a recording parameter of the image recording device in the user output interface, wherein the position of the measurement point is displayed relative to the complete and untransformed scene imaged onto the image area. A measurement point that is arranged outside the image section can thereby in particular also be displayed and used to determine the recording parameter. The image recording device can in particular be configured to consider measurement data of the measurement point even if it is arranged outside the image section.

The measurement point can, for example, be a focus measurement point, an exposure measurement point, a measurement point for determining a color temperature for a white balance of the image data set or the like. The measurement point can, for example, be set by means of a user input. The user input can, for example, be detected via a mechanical operating element of the image recording device, for example, a button, a switch, or a joystick. Alternatively or additionally, the user input can also be detected via an electronic control element, for example, a touchscreen or a touch-sensitive screen.

In a further development, the image recording device comprises a combined user interface that comprises the user output interface and a superposed position input interface for defining the position of the measurement point relative to the untransformed scene, wherein the combined user interface is, for example, configured to detect the position of the measurement point as that position within the untransformed scene at which an actuation of the superposed position input interface is detected. In this way, the position of the measurement point can be determined particularly easily and intuitively. The combined user interface can, for example, be a touch-sensitive screen, wherein the untransformed scene can in particular be displayed in the screen.

In a further development, the reference direction lies in the projection plane. Alternatively, the projection plane can be tilted with respect to the reference direction by a residual angle, wherein the residual angle is different from zero and is smaller than the tilt angle. For example, the residual angle can amount to at most 10%, for instance at most 5%, at most 2%, or at most 1% of the tilt angle. The residual angle can in particular amount to 2% of the tilt angle. At the same time, the projection plane can be aligned in parallel with the horizontal axis. Since the tilt is only corrected up to a residual angle different from zero, an undercorrection of the tilt takes place, which can in particular at great tilts result in a corrected image data set that appears more natural than a complete correction.

In a further development, the image sensor is configured to acquire a sequence of image data sets that represent the scene imaged onto the image area at consecutive points in time and the position sensor is configured to detect a respective spatial position of the image sensor for each image data set and to provide respective position data. Furthermore, the evaluation unit is configured to determine a respective image section for each image data set projected onto a respective projection plane by means of a projective transformation determined from the respective position data and to successively display the respective image sections at least together with the region of the scene imaged onto the image area that lies within the respective image section in the graphical user output interface.

This enables a user of the image recording device to define the scene imaged onto the image sensor based on the displays in the user output interface. In particular in such a further development, the user output interface can be configured as an electronic viewfinder or as a screen arranged at a housing of the image recording device. The image recording device can, for example, be configured to perform the acquisition of the respective image data sets and the determination and/or display of the respective image sections at a repetition rate of at least 5 images per second, for example, at least 5, 10, 20, 40, 50, 60, or 120 images per second. In this respect, the position data can also be provided by the position sensor at a frequency different from the repetition rate, for example, at a lower frequency. In this case, the image section can be determined and/or displayed a multiple of times after one another based on the same position data.

A method of operating an image recording device is further specified, wherein the method comprises:
  acquiring an image data set using an image sensor of the image recording device, wherein the image data set represents an imaging of a scene located in front of the image sensor onto an image area of the image sensor;
  detecting a spatial position of the image area relative to a reference direction;
  providing position data that specify both an angle of rotation, by which the image area is rotated about an optical axis of the image sensor, in particular with respect to a perpendicular projection of the reference direction onto the image area, on the acquisition of the image data set, and a tilt angle by which the image area is tilted about a horizontal axis, in particular with respect to the reference direction, on the acquisition of the image data set, wherein the horizontal axis is oriented perpendicular to the optical axis and perpendicular to the reference direction;
  determining a projective transformation from the position data, wherein the projective transformation maps the image data set onto a projection plane in dependence on both the rotation and the tilt from the image area, wherein the projection plane is tilted with respect to the image area about the horizontal axis in dependence on the tilt angle and intersects the image area along an intersection line that is rotated in the image area with respect to center axes of the image area in dependence on the angle of rotation;
  determining an image section in the projection plane for the image data set mapped onto the projection plane by means of the projective transformation;
  displaying the image section simultaneously with at least a region of the scene imaged onto the image area that lies within the image section in a graphical user output interface of the image recording device.

The method can in particular be performed by the image recording device specified. In this regard, all the further developments and technical effects that are disclosed in connection with the image recording device also relate to the method specified, and vice versa.

Figure 2:
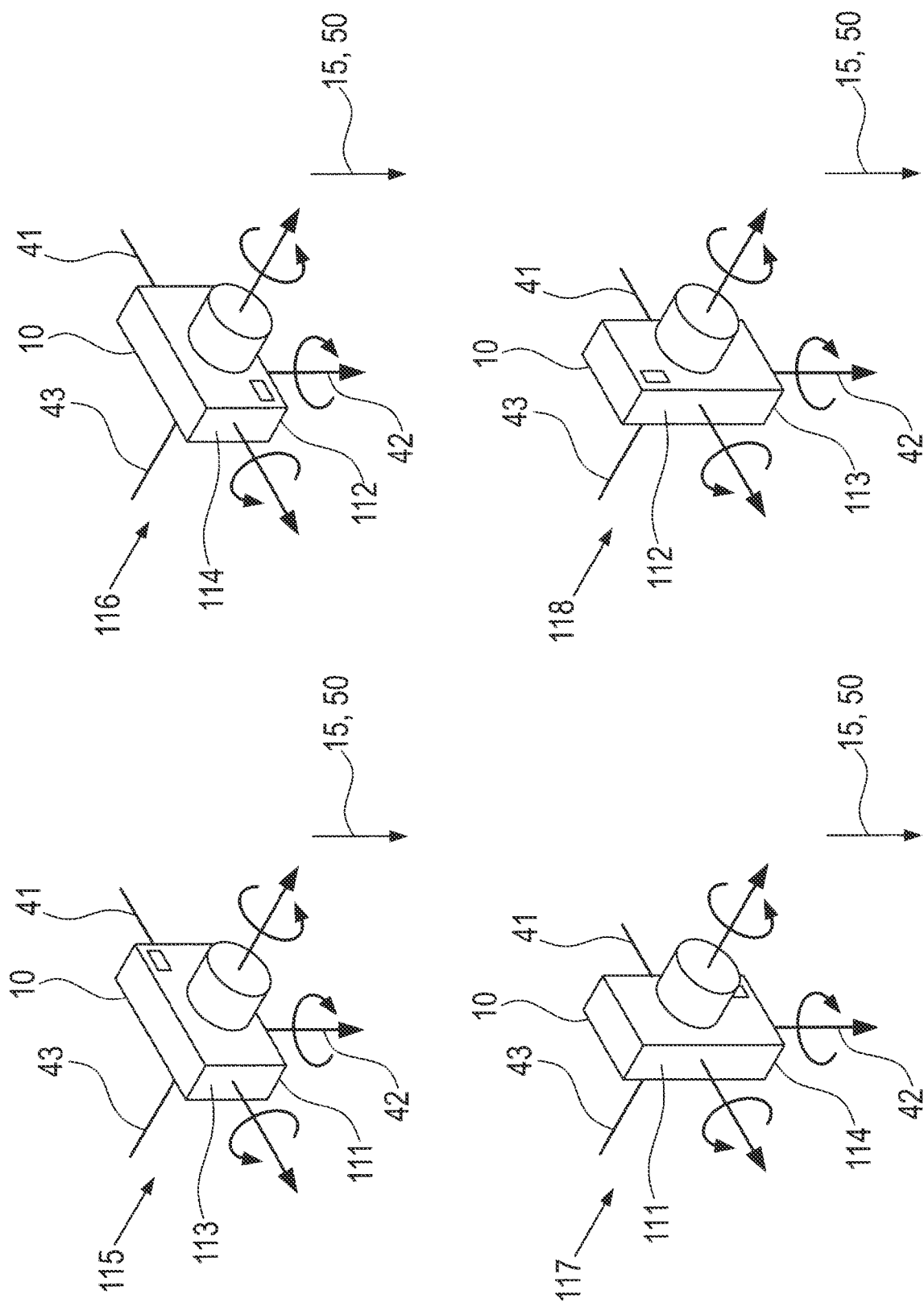
Figure 3:
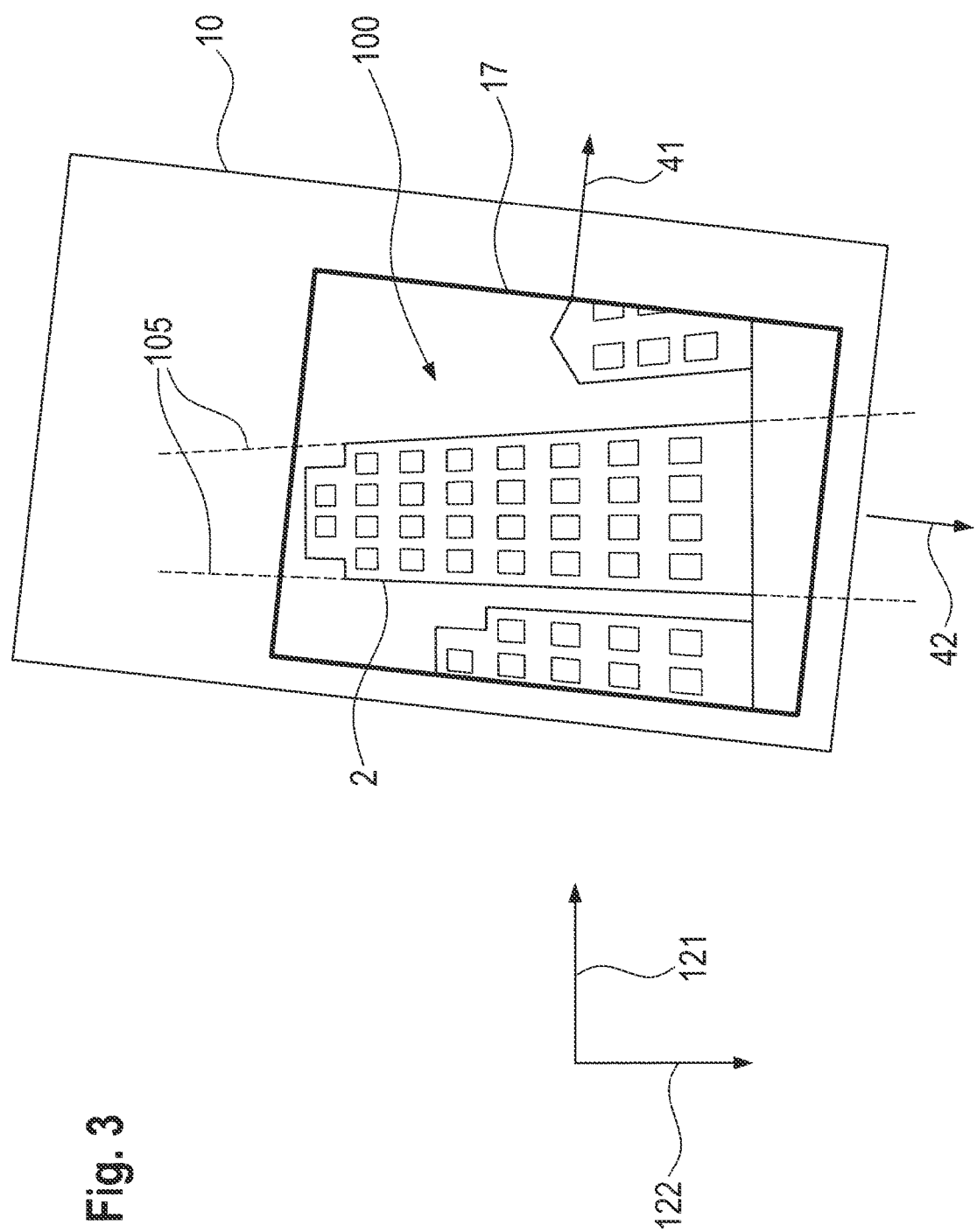
Figure 4:
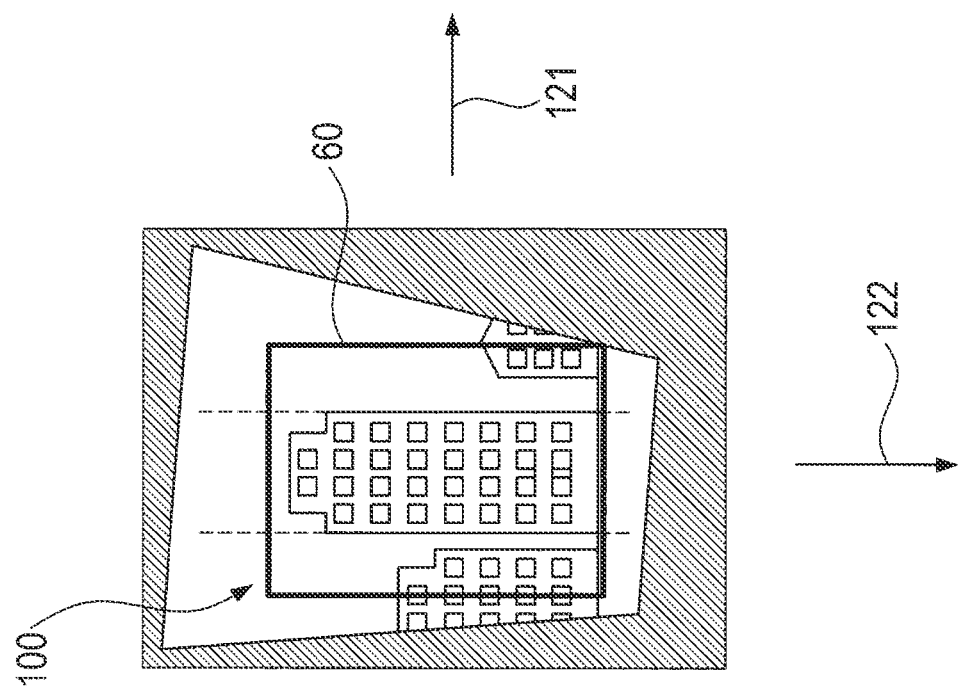
Figure 5:
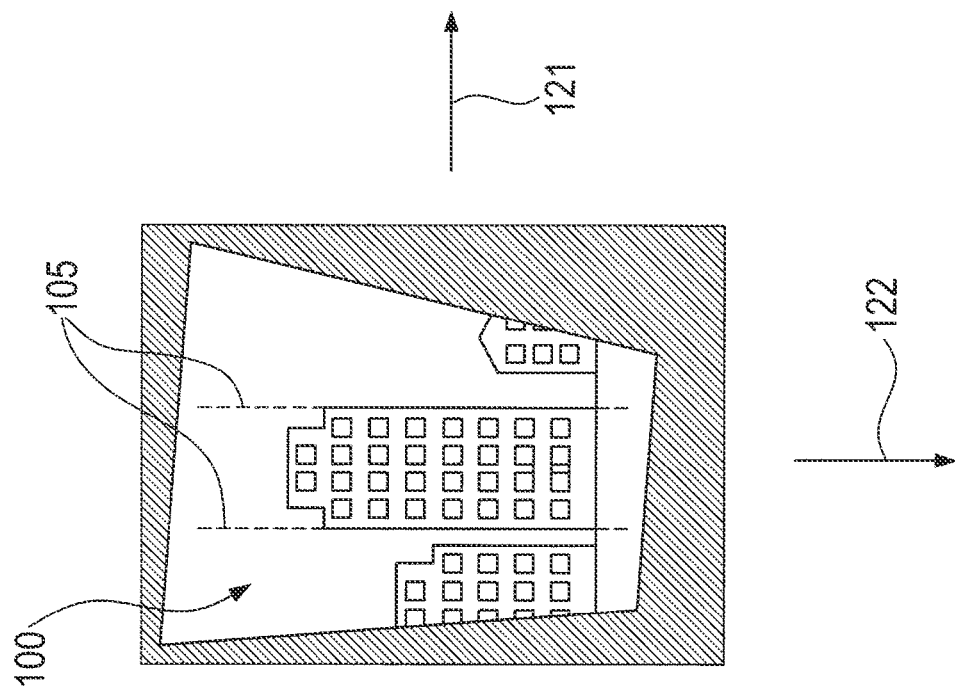
Figure 8:
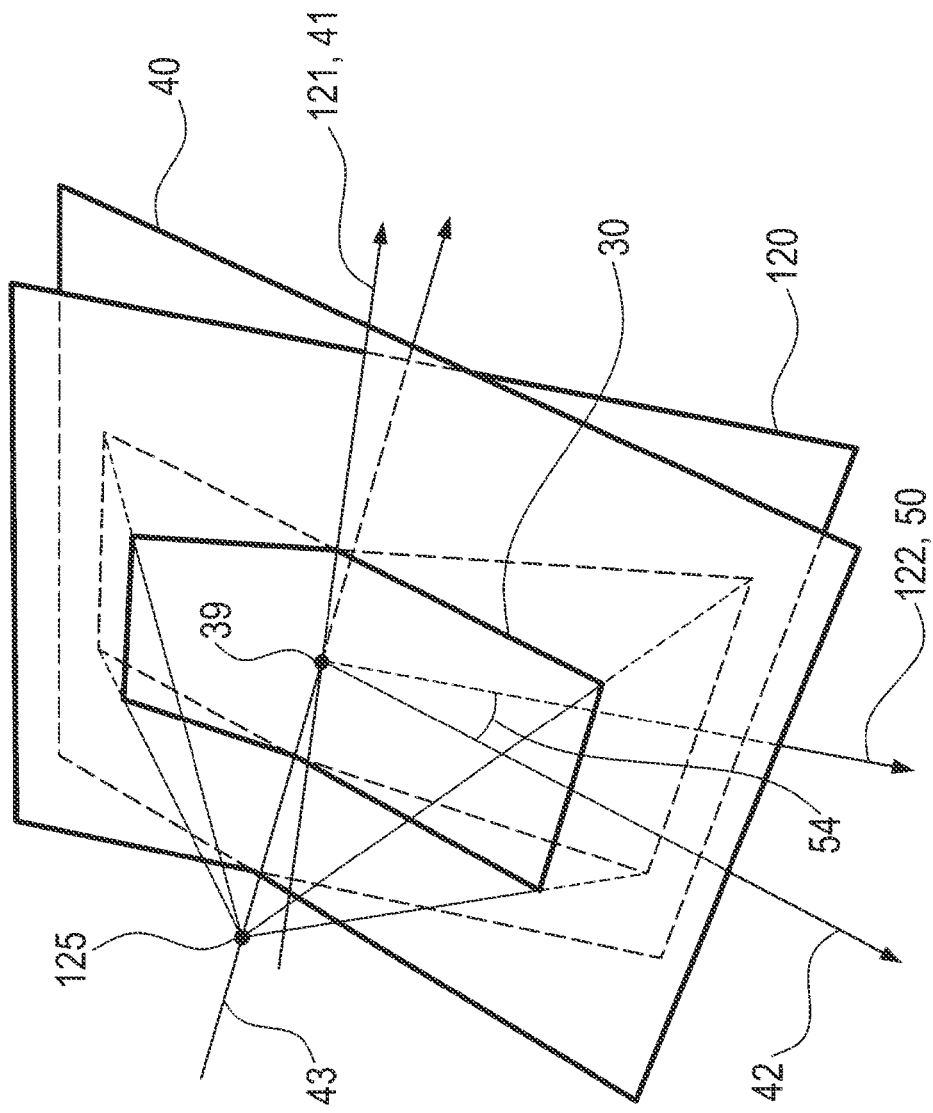
Figure 9:
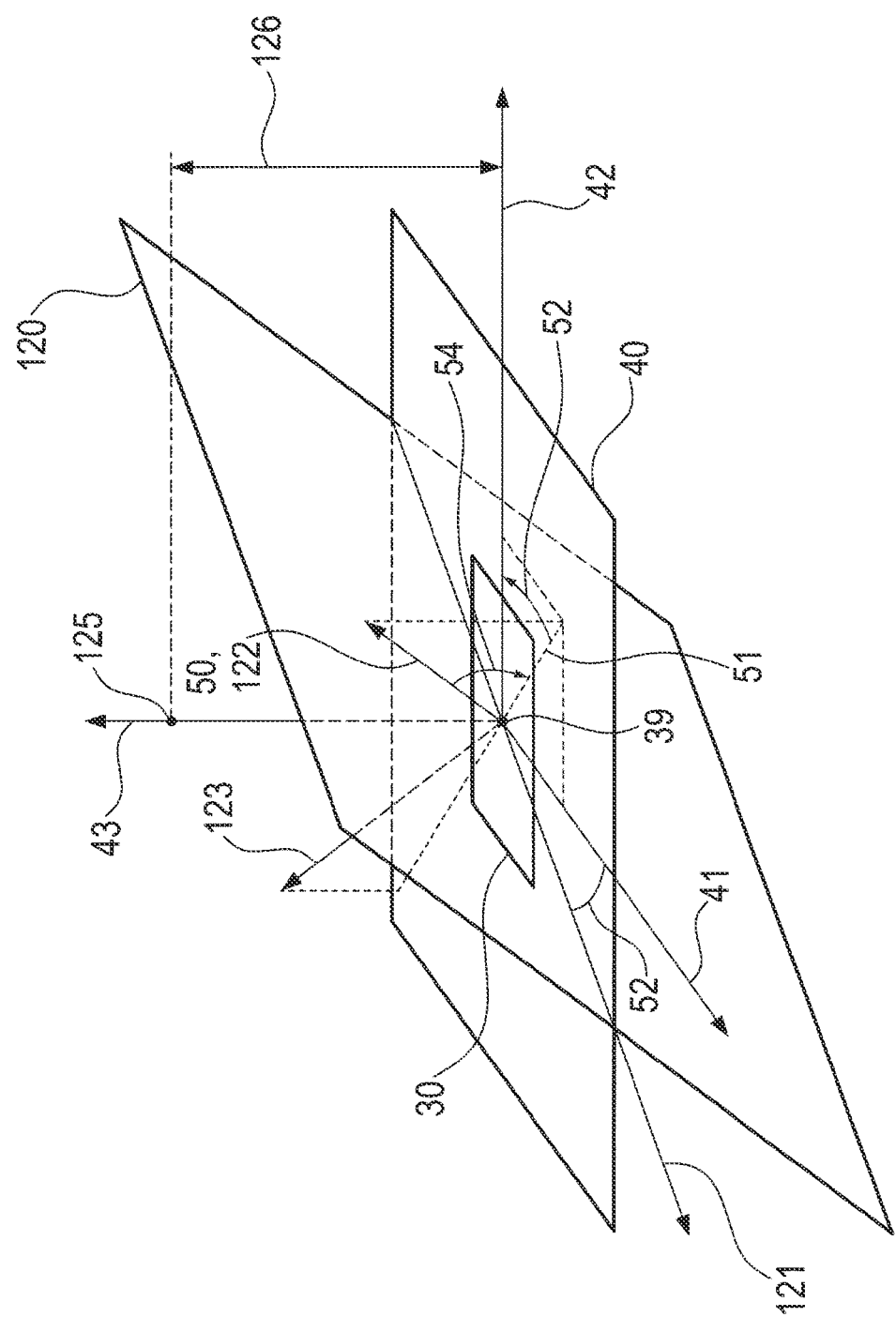
Figure 10:
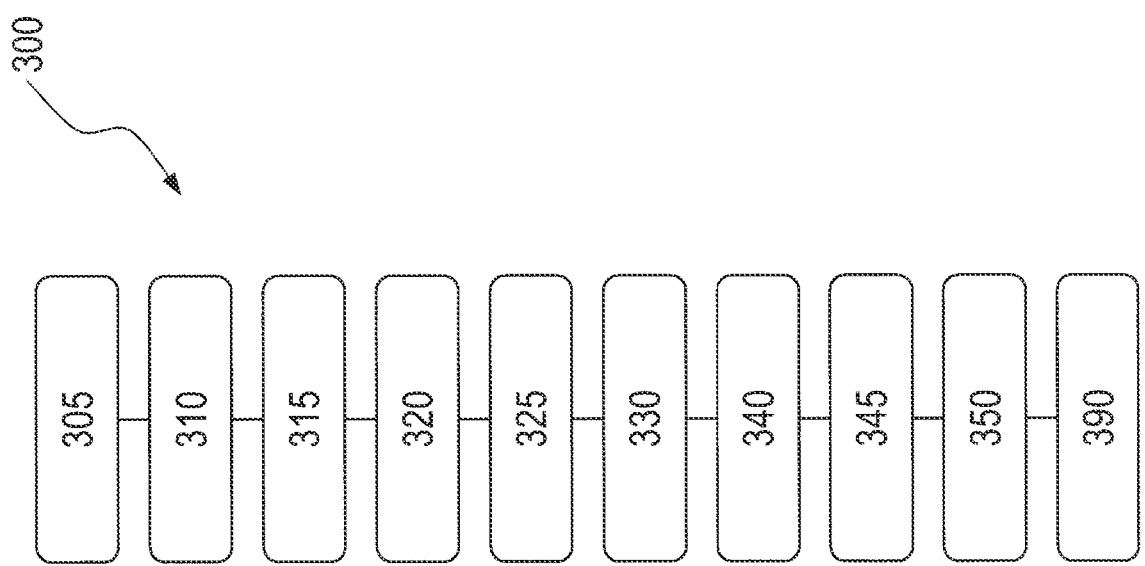
Figure 11:
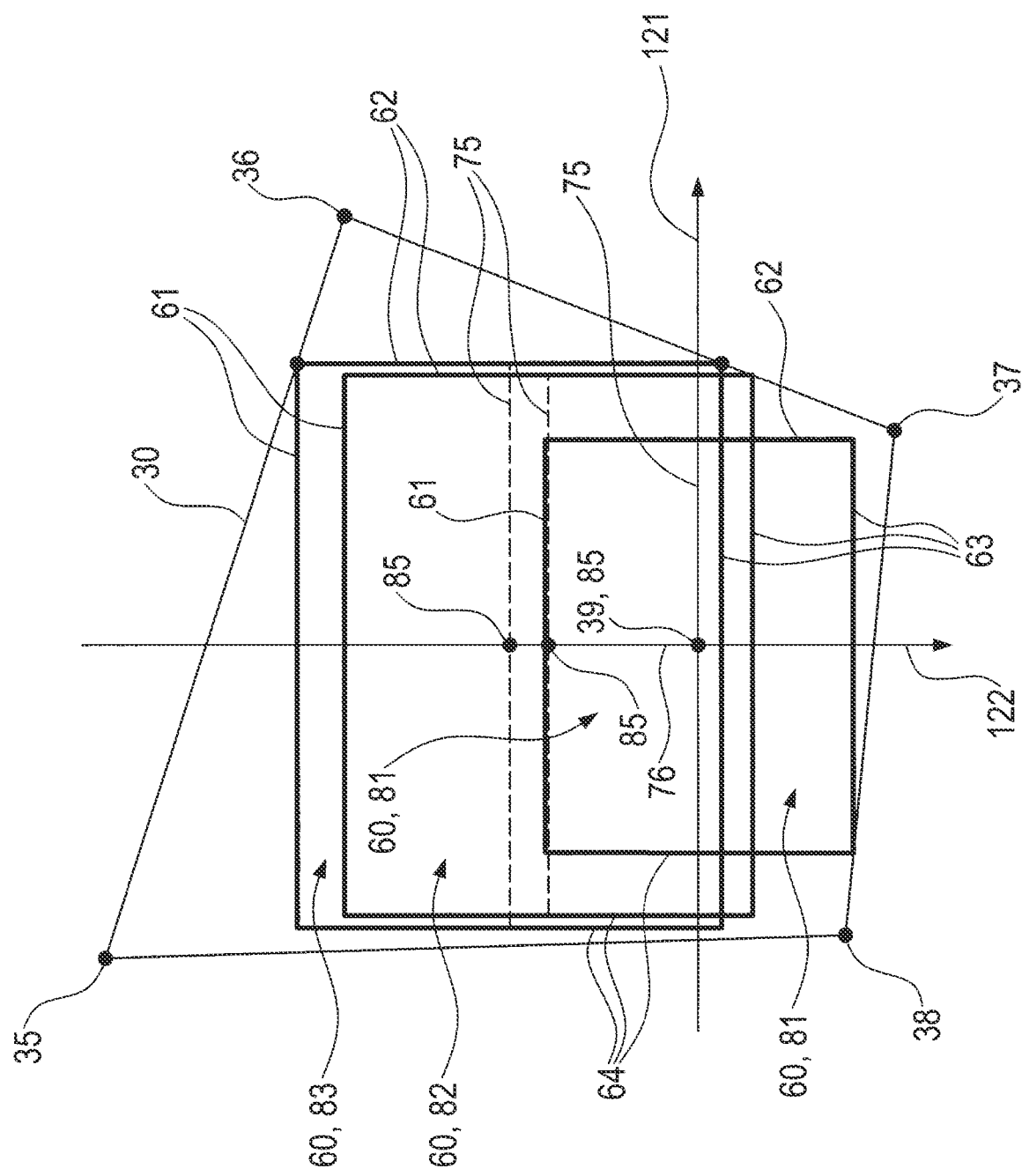
Figure 12:
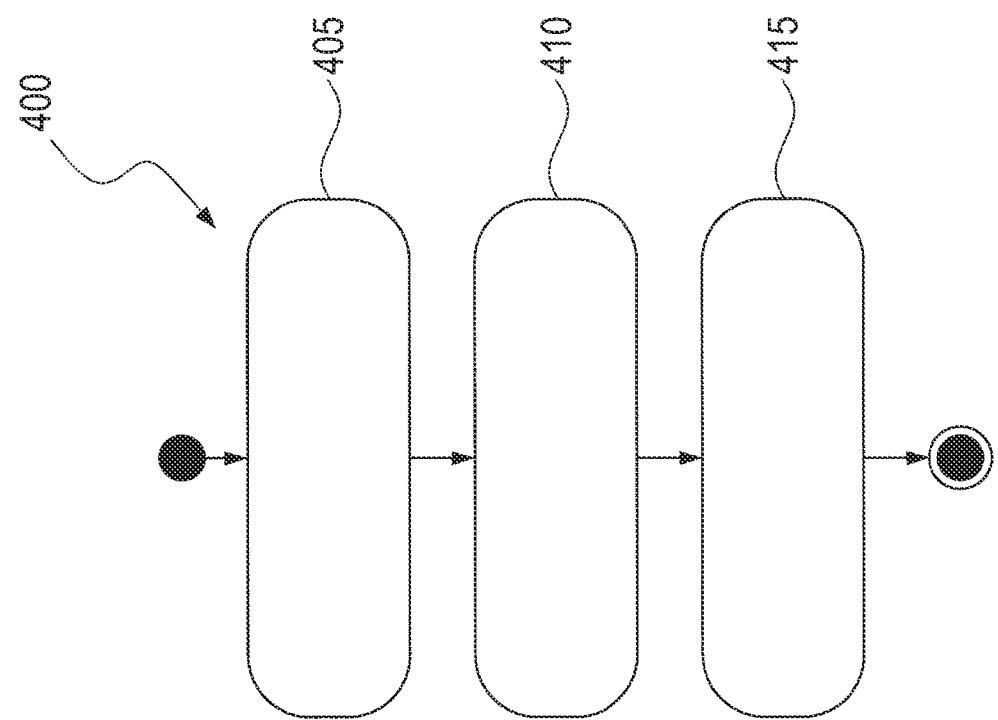
Figure 13:
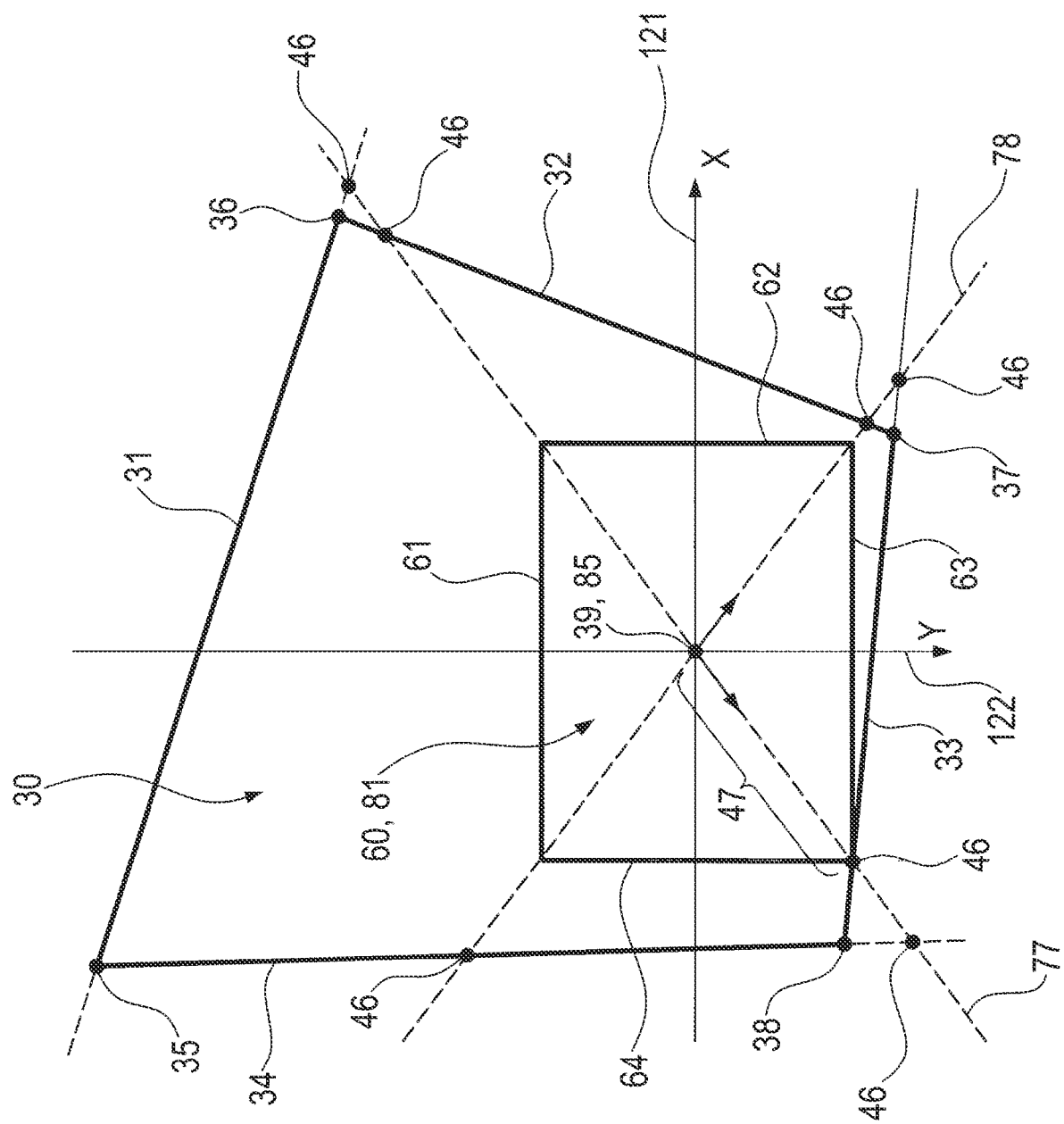
Figure 14:
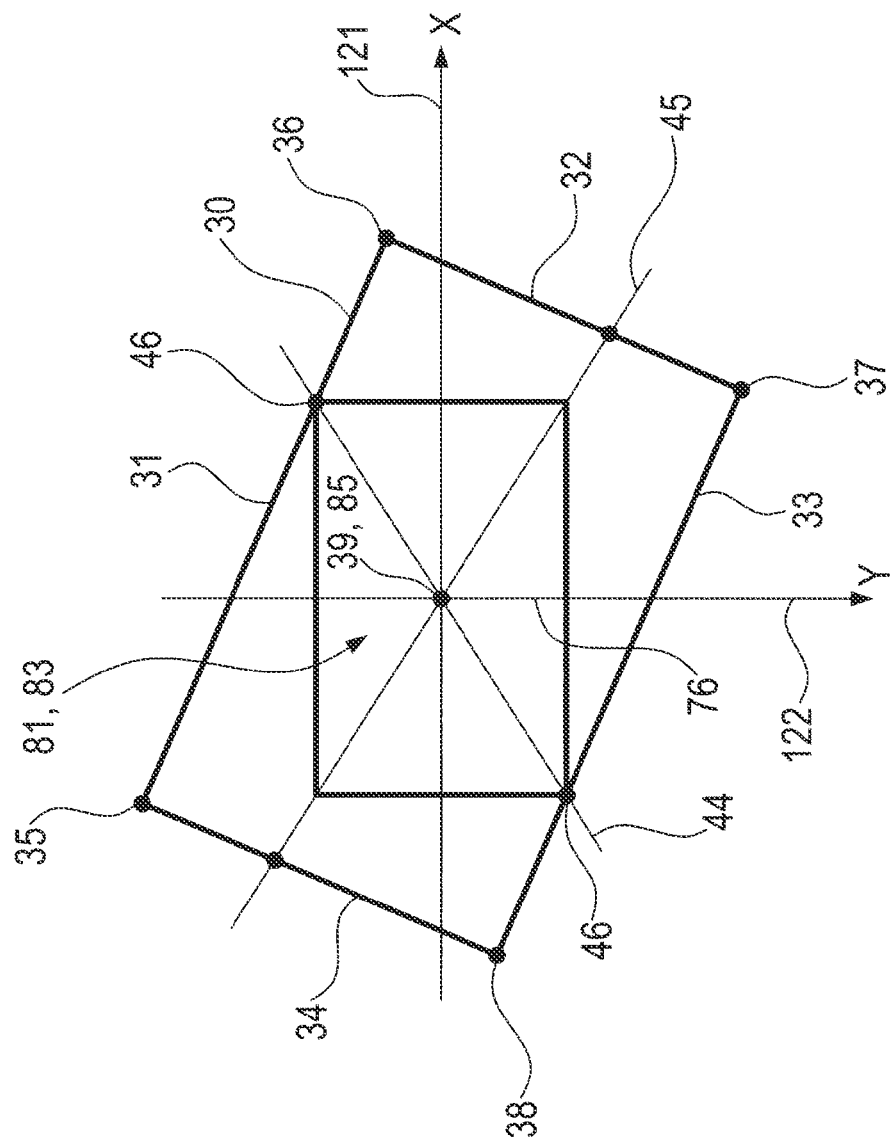
Figure 15:
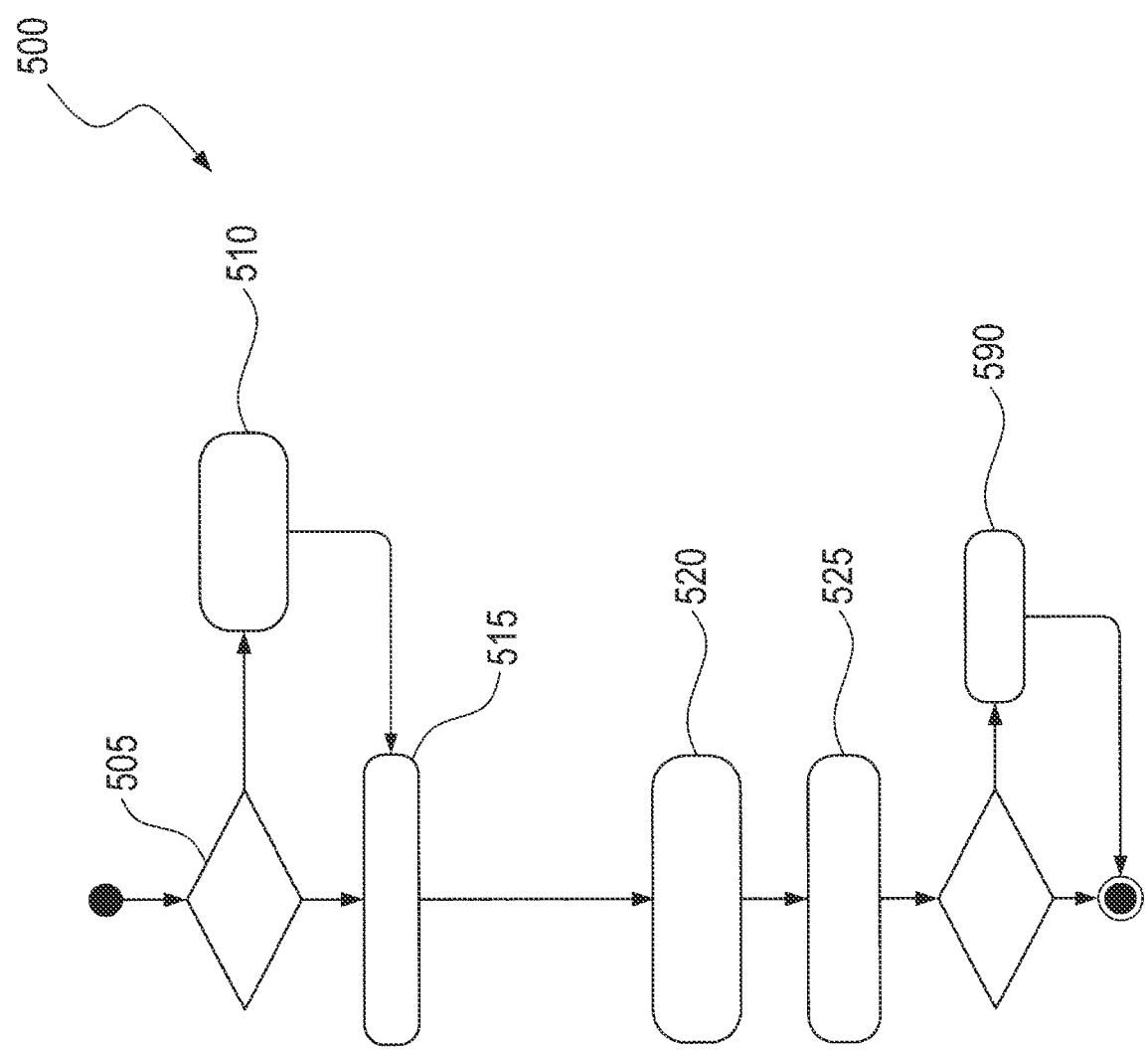
Figure 16:
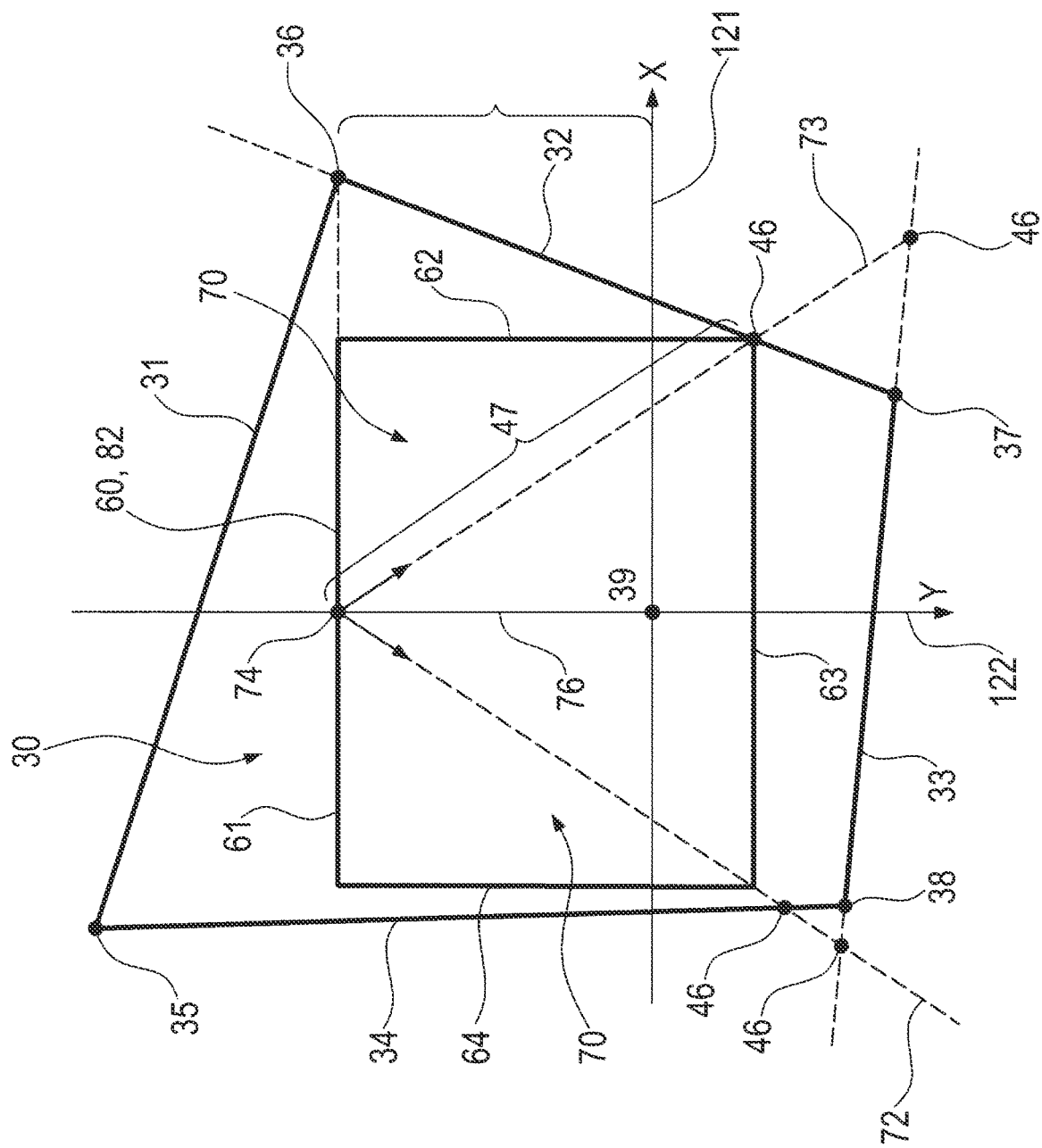
Figure 17:
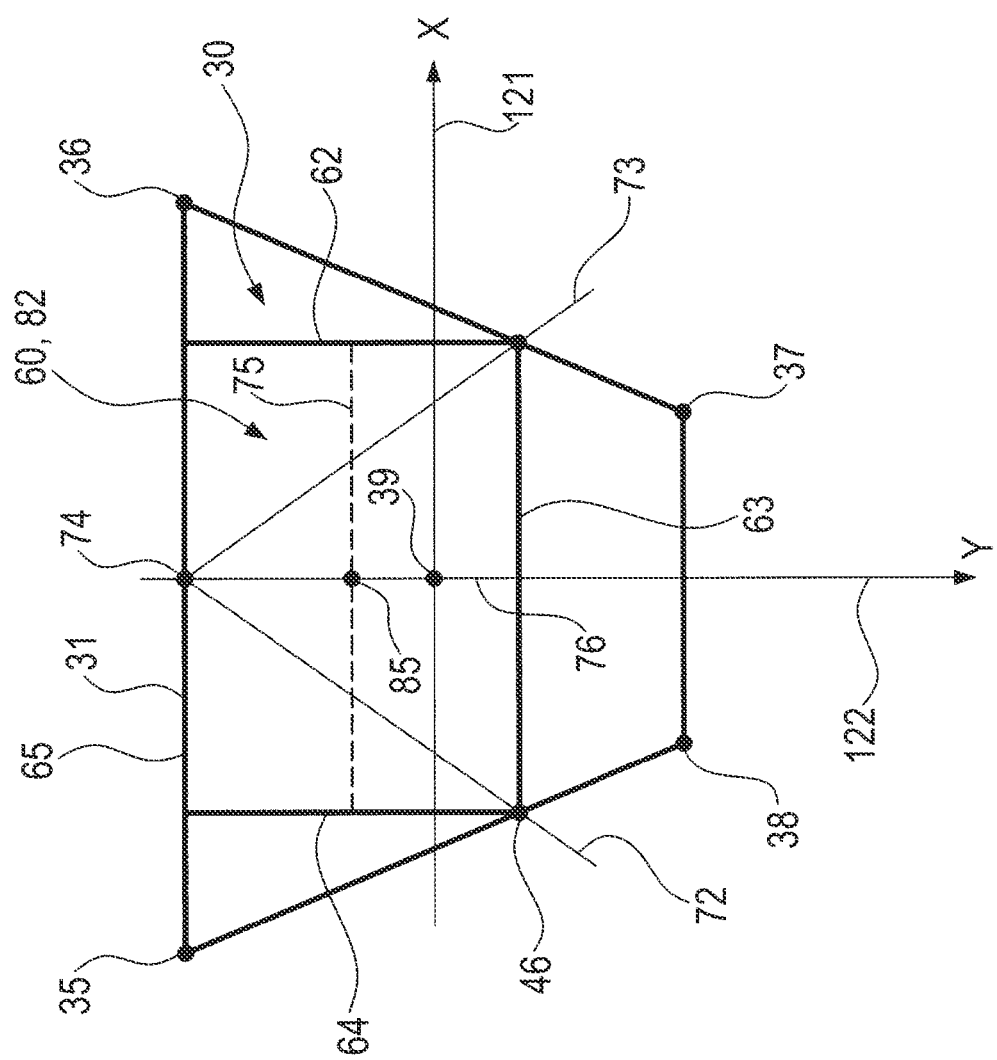
Figure 18:
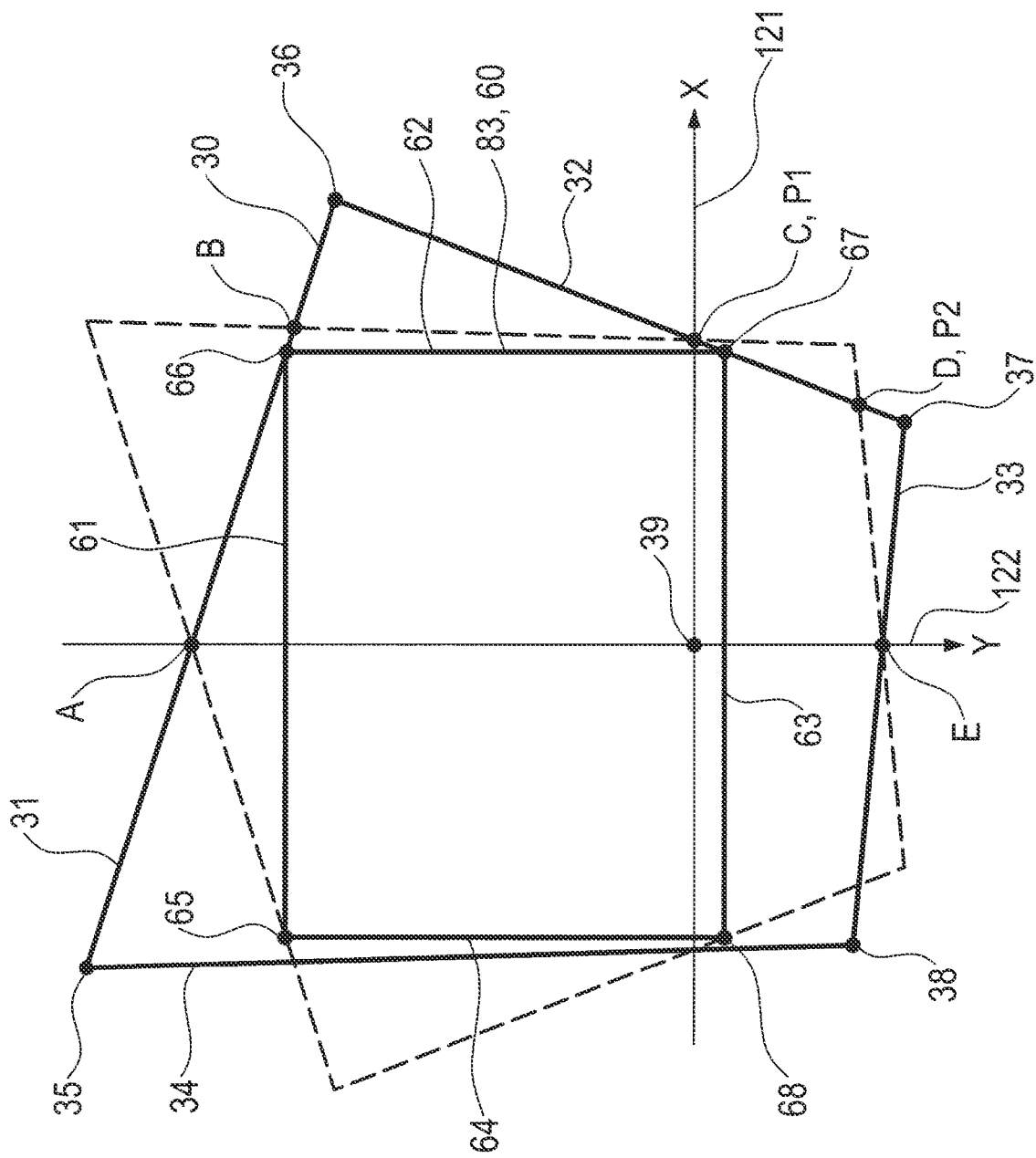
Figure 19:
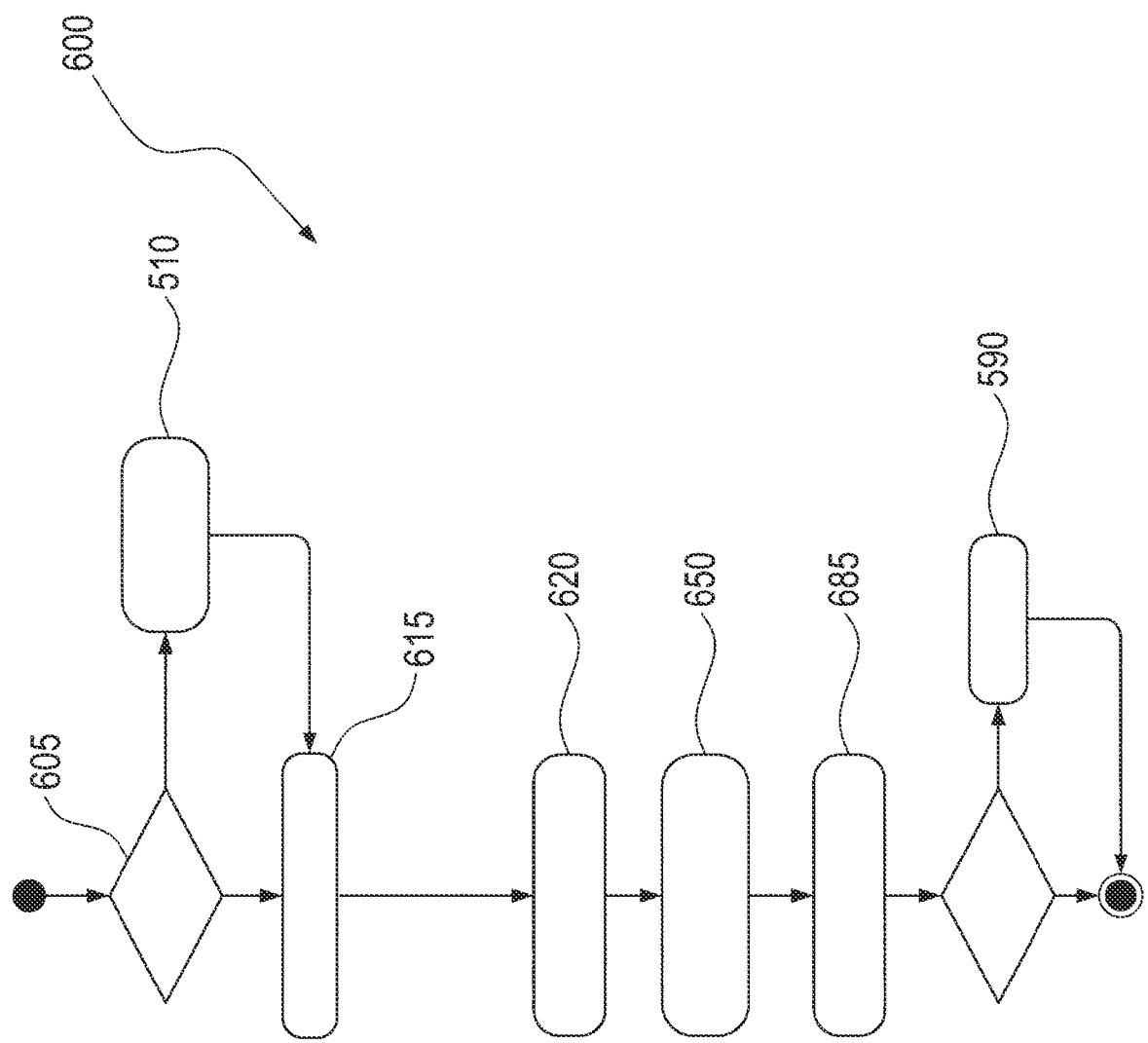
Figure 20:
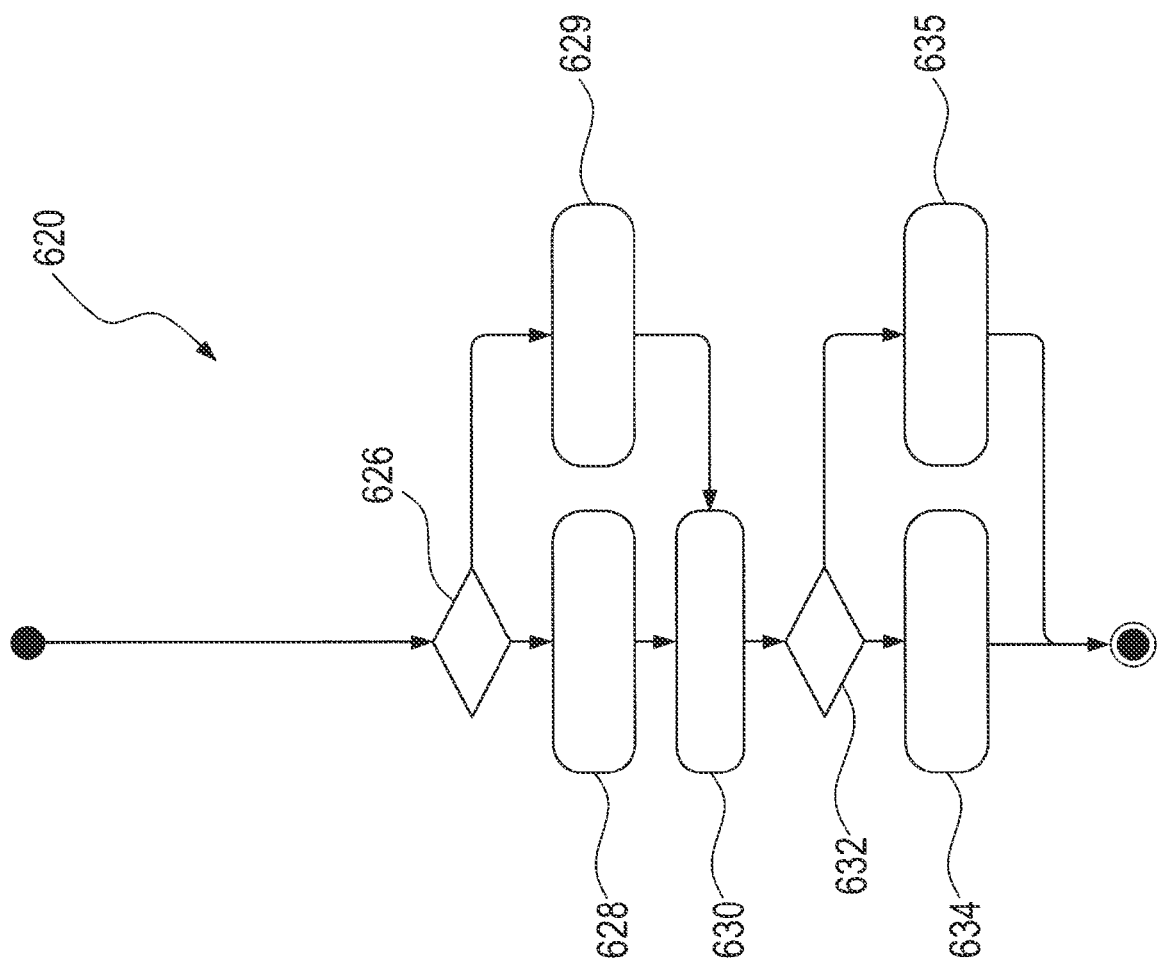
Figure 21:
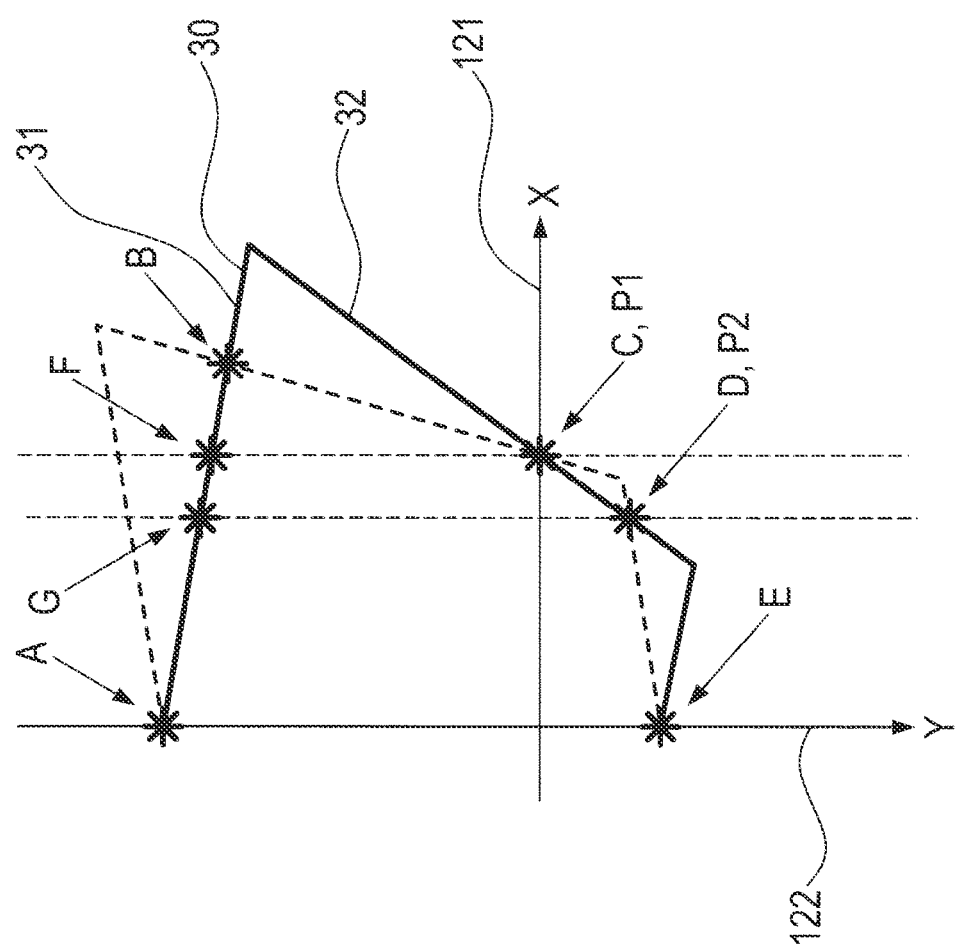
Figure 22:
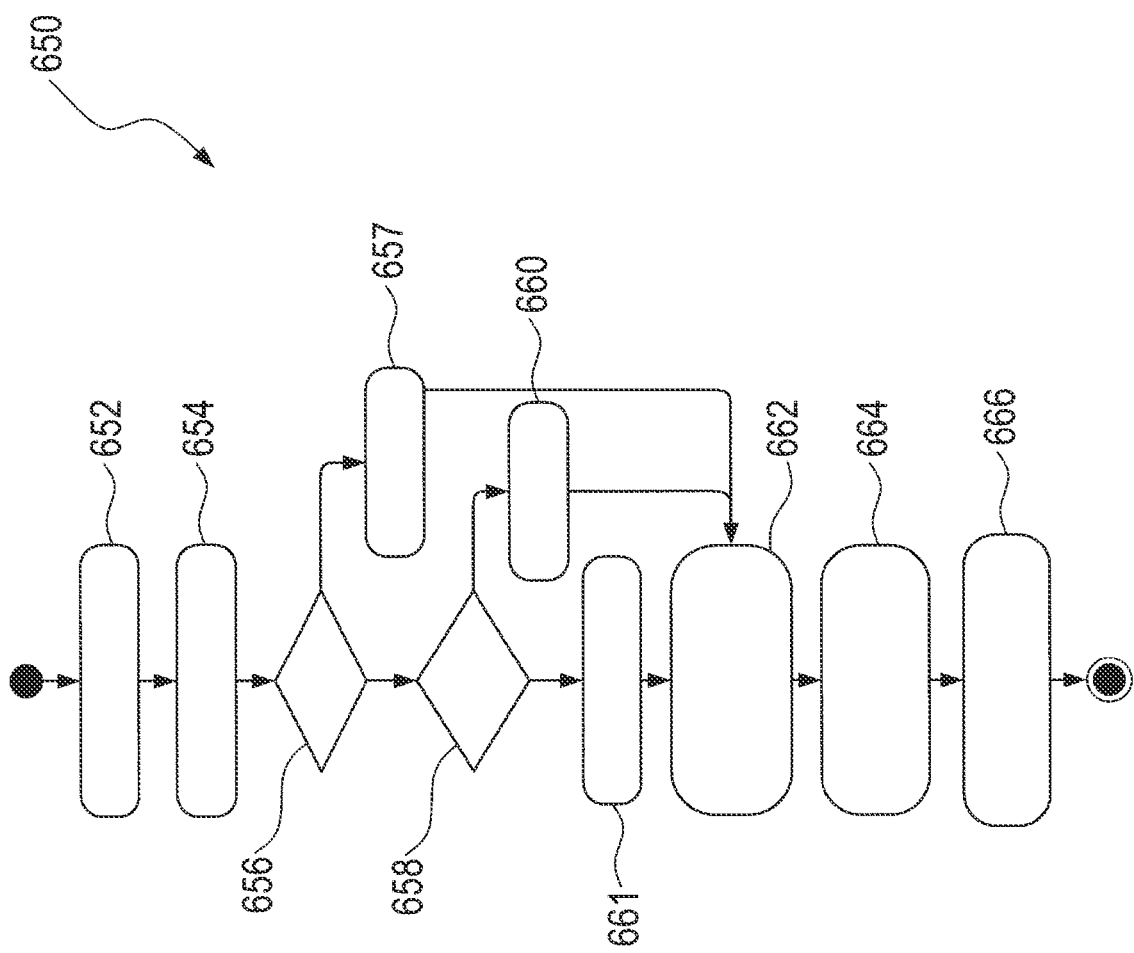
Figure 23:
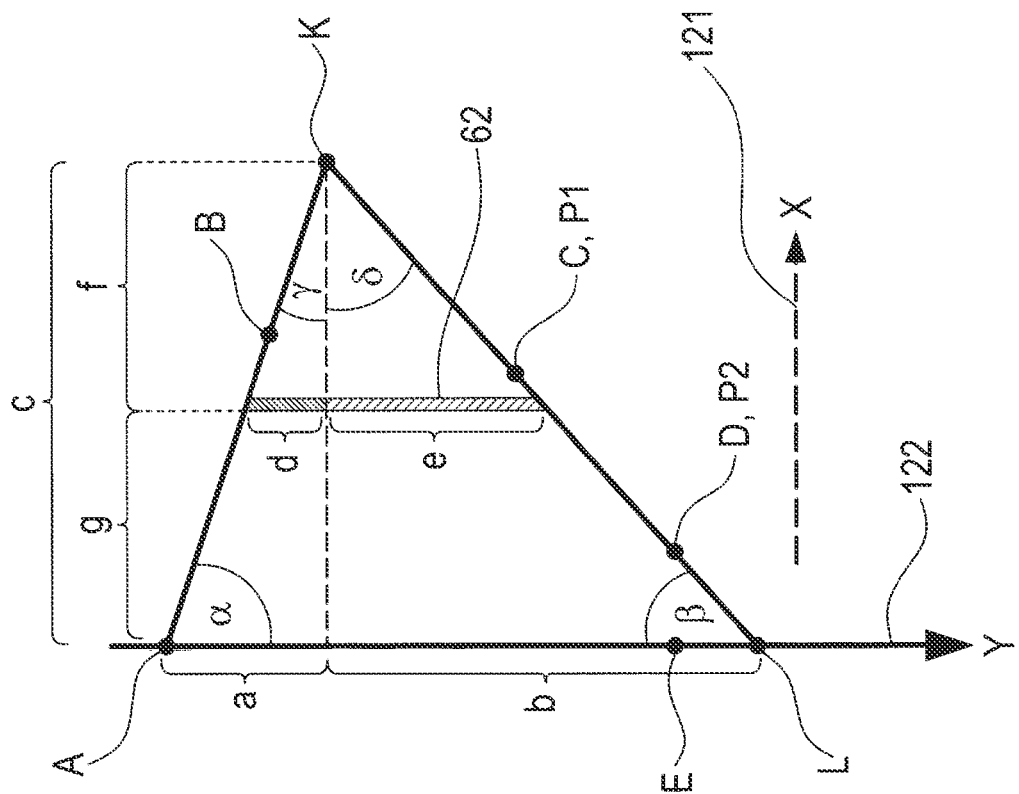

The invention will be explained in the following with reference to Figures. There are shown in a schematic representation in each case:

FIG. 1 an image recording device with a scene located in front of an image sensor of the image recording device;

FIG. 2 a first, second, third, and fourth spatial position of the image recording device;

FIG. 3 the image recording device with a display of the scene in a user output interface of the image recording device;

FIG. 4 the recorded scene in a projection onto a projection plane;

FIG. 5 an image section of the scene determined in the projection plane;

FIG. 6 the user output interface with a first display of the image section and of a region of the scene located within the image section;

FIG. 7 the user output interface with a second display of the image section and of a region of the scene located within the image section;

FIG. 8 a projective transformation of an image area of the image sensor onto the projection plane;

FIG. 9 the image area of the image sensor and the projection plane;

FIG. 10 a method of displaying the image section in user output interfaces of the image recording device;

FIG. 11 the image area projected onto the projection plane with a first, second and third image section;

FIG. 12 a method of determining the first image section;

FIG. 13 the first image section and the projected image area for angles of rotation and tilt angles different from zero;

FIG. 14 the first image section for a tilt angle equal to zero;

FIG. 15 a method of determining the second image section;

FIG. 16 the second image section and the projected image area for angles of rotation and tilt angles different from zero;

FIG. 17 the second image section for a tilt angle equal to zero;

FIG. 18 a graphical representation of a method of determining the third image section;

FIG. 19 a further method of determining the third image section;

FIG. 20 a method of determining points of intersection shown in FIG. 18;

FIG. 21 the projected image area with further points of intersection;

FIG. 22 a method of defining the further points of intersection shown in FIG. 21;

FIG. 23 the projected image area with further points of intersection; and

Figure 24:
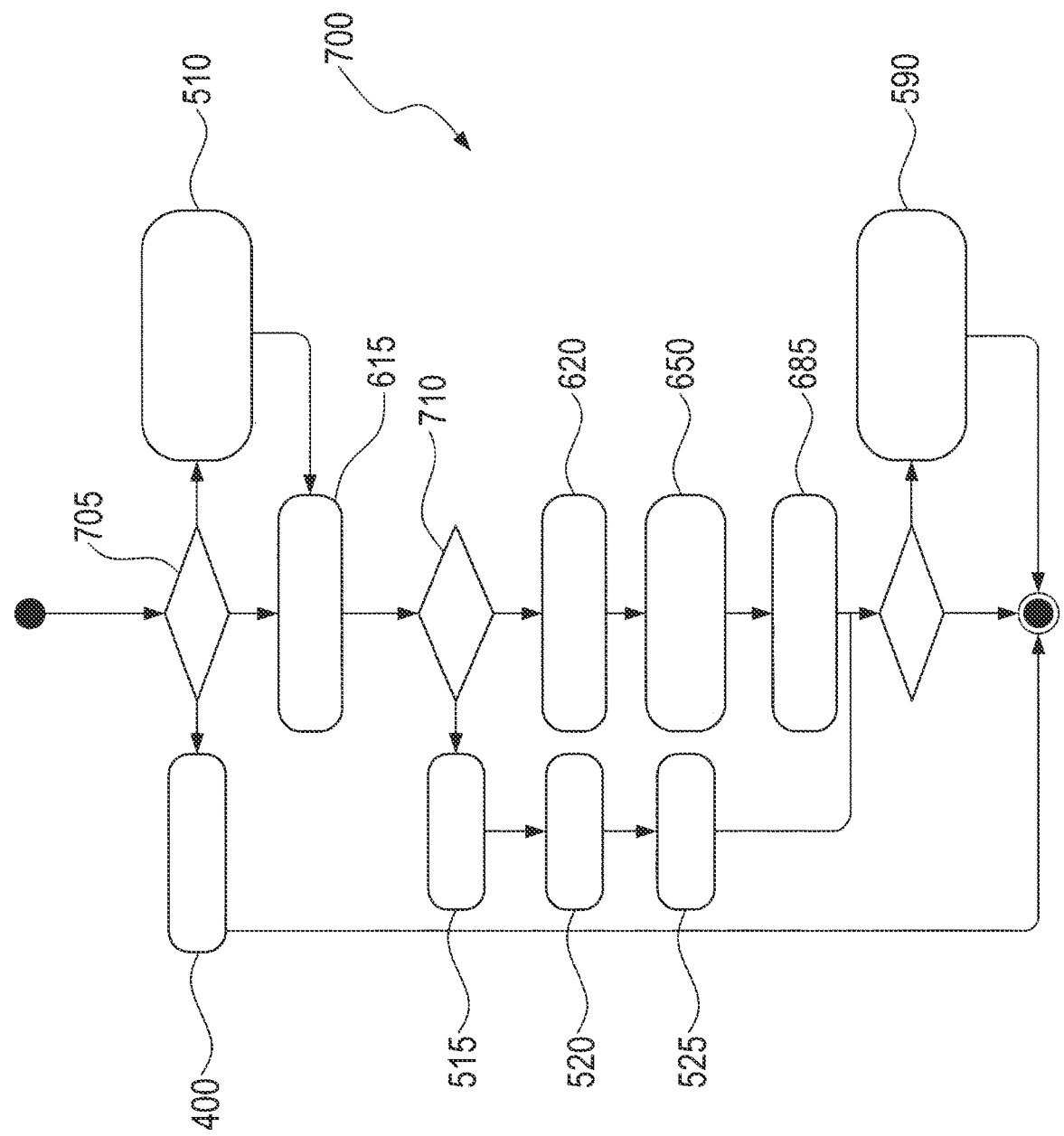

FIG. 24 a further method of determining the image section.

FIG. 1 shows an image recording device 10, which is configured as a mirrorless system camera, with a scene 1 located in front of the image recording device 10. The image recording device 10 comprises an optoelectronic image sensor 12 and an imaging optics 18 that is configured as an interchangeable lens and that images the scene 1, including a building 2 arranged within the scene 1, onto an image area 30 of the image sensor 12 facing the imaging optics 18. An optical axis 43 of the image sensor 30 coincides with an optical axis of the imaging optics 18 in this respect.

The image recording device 10 further comprises an evaluation unit 20 that is connected to the image sensor 12, a position sensor 14 of the image recording device 10, a first user interface 16 of the image recording device 10 configured as an electronic viewfinder, a second user interface 17 of the image recording device configured as a rear screen, and an electronic memory unit 22. The individual components of the image recording device 10 are in this respect arranged at or in a common housing 11.

The optoelectronic image sensor 12 and the position sensor 14 are in particular arranged in a stationary manner with respect to one another within the housing 11. The position sensor 14 is configured as a triaxial acceleration sensor that determines a spatial position of the position sensor 14 and of the image sensor 12, which is connected in a stationary manner to the position sensor 14, relative to a reference direction 50 given by the gravitational acceleration 15 and transmits position data representing the spatial position to the evaluation unit 20.

In the spatial position of the image recording device 10 shown in FIG. 1, the image sensor 30 is tilted about a horizontal axis 121, which is oriented perpendicular to the reference direction 50 and perpendicular to the optical axis 43, by a tilt angle 54 so that the optical axis 43 intersects the building 2 at an angle different from a right angle. The optical axis 43 thereby deviates from a longitudinal axis 123 oriented perpendicular to the horizontal axis 121 and perpendicular to the reference direction 50.

Furthermore, in the spatial position of the image recording device 10 shown in FIG. 1, the image area 30 does not have a rotation with respect to the reference direction 50 about the optical axis 43. Thus, a first center axis 41 of the image area 30 coincides with the horizontal axis 121 and a second center axis 42 of the image area 30 oriented perpendicular to the first center axis 41 is arranged in a vertical plane spanned by the reference direction 50 and the optical axis 43. The first and second center axes 41, 42 are each oriented perpendicular to the optical axis 43 in this respect. The center axes 41, 42 and the optical axis 43 form a Cartesian sensor coordinate system overall. Similarly, the horizontal axis 121, a vertical axis 122 extending in parallel with the reference direction 50, and the longitudinal axis 123 form a Cartesian coordinate system.

FIG. 2 shows the image recording device 10 in a first spatial position 115, a second spatial position 116, a third spatial position 117, and a fourth spatial position 118. The orientation of the sensor coordinate system is selected in the different positions 115, 116, 117, 118 in each case such that the second center axis 42 encloses a smaller angle with the reference direction 50 than the first center axis 41. Furthermore, directions of the sensor coordinate system are selected such that a projection of a reference vector defining the reference direction 50 onto the second center axis 42 results in a positive coordinate value.

This has the result that, in the first position 115, in which a lower side 111 of the image recording device 10 is oriented towards the reference direction 50, the first center axis 41 is oriented towards a right side 113 and the second center axis is oriented towards the lower side 111 of the image recording device 10. In the second position 116, in which an upper side 112 of the image recording device 10 is oriented towards the reference direction 50, the first center axis 41 is oriented towards a left side 114 of the image recording device 10 and the second center axis 42 is oriented towards the upper side 112. In the third position 117, the left side 114 of the image recording device 10 is oriented towards the reference direction 50, consequently, the first center axis 41 is oriented towards the lower side 111 and the second center axis 42 is oriented towards the left side 114 of the image recording device 10. In the fourth position 118, the right side 113 of the image recording device 10 is oriented towards the reference direction 50, whereby the first center axis 41 is oriented towards the upper side 112 and the second center axis 42 is oriented towards the right side 113 of the image recording device 10.

During the recording of the scene 1 shown in FIG. 1, the image sensor 12 acquires a sequence of image data sets that each represent the scene imaged onto the image area 30 at consecutive points in time. Synchronously, the individual image data sets of the sequence are each at least regionally displayed in the user output interfaces 16, 17 to enable a user of the image recording device 10 to select the region of the scene 1 to be recorded.

FIG. 3 shows, by way of example, the screen 17 with such an image data set 100. The image data set 100 is displayed untransformed on the screen 17 so that parallel edges 105 of the building 2 are reproduced as plunging lines due to the tilt of the image sensor 12 about the horizontal axis 121.

The evaluation unit 20 is configured to perspectively correct the image data sets 100 by means of a projective transformation in each case, while taking into account the tilt angle 54 and an angle of rotation of the image sensor 12 about the optical axis 43, wherein the angle of rotation corresponds to the angle between the horizontal axis 121 and the first center axis 41. Both the tilt angle 54 and the angle of rotation are in this respect determined from the position data provided by the position sensor 14.

FIG. 4 shows the result of such a projective transformation of the image data set 100 shown in FIG. 3. After applying the projective transformation, the edges 105 of the building 2 extend in parallel with one another as well as in parallel with the vertical axis 122 and thus in parallel with the reference direction 50. As can be seen from FIG. 4, the margins of the image data set 100 that correspond to the margins of the image area 30 are distorted by the projective transformation so that the image data set 100 no longer has a rectangular margin.

To correct the distortion of the margin of the image area 30 when applying the projective transformation, the evaluation unit 20 is configured to determine a rectangular image section 60 shown in FIG. 5. In this respect, the image section 60 shown in FIG. 5 is determined completely within the image data set 100. In alternative embodiments, the image section 60 can also comprise regions outside of the image data set 100. The evaluation unit 20 is further configured to display the image section 60 and at least a region of the scene 1 located within the image section 60 in the user output interfaces 16, 17.

FIG. 6 shows a first display of the image section 60 and of the region of the scene 1 located within the image section 60 in the second user output interface 17. The region lying within the image section 60 is in this respect displayed untransformed. In addition to the region of the scene 1 within the image section 60, the remainder of the scene 1 imaged onto the image area 30 is also displayed untransformed. The image section 60 is reproduced as a frame superposed on the scene 1 shown.

In FIG. 6, a first measurement point 91 is furthermore shown that is displayed superposed on the image data set 100 in the user output interface 17 and defines a focus measurement point for an autofocus function of the imaging optics 18. In this respect, the focus measurement point is arranged outside the image section 60 so that the autofocus function focuses on a region of the scene 1 that lies outside the image section 60. Furthermore, a second measurement point 92, which defines an exposure measurement point, is likewise displayed superposed on the image data set 100. The second measurement point 92 lies within the image section 60 so that a region of the scene 1 that lies within the image section 60 is exposed.

The second user output interface 17 is part of a combined user interface that is configured as a touch-sensitive screen and that comprises a superposed touch-sensitive position input interface in addition to the user output interface 17. The positions of the measurement points 91, 92 can be defined by means of the position input interface. In this respect, the first measurement point can in particular also be placed within the image section 60 and/or the second measurement point 92 can be placed outside the image section 60.

FIG. 7 shows a second display of the image section 60 and of the region of the scene 1 imaged onto the image sensor 12 that is located within the image section 60. The region of the scene 1 lying within the image section 60 is in this respect reproduced transformed as shown in FIGS. 4 and 5 and is bounded by the margins of the user output interface 17. In this regard, the image section 60 is displayed by showing only the region of the scene 1 imaged onto the image sensor 12 that lies within the image section 60.

In alternative embodiments, the region of the scene 1 located within the image section 60 can also be displayed by applying the projective transformation and the image section 60 can be displayed as a frame. In this respect, all the regions of the imaged scene 1 that are located outside the image section 60 can additionally also be reproduced transformed, for instance, in the manner shown in FIG. 5. In such a display, it is likewise possible to set the measurement points 91, 92 both outside and within the image section.

FIG. 8 shows the projective transformation, which is performed by the evaluation unit 20 to determine the image section 60, for the spatial position of the image recording device 10 shown in FIG. 1. In the projective transformation, the image area 30 of the image sensor 12 is projected onto a projection plane 120 by a projection center 125 arranged on the optical axis 43. The projection plane 120 in this respect encloses the tilt angle 54 with an image plane 40 defined by the image area 30.

The projection plane 120 is oriented perpendicular to a vertical plane, which is spanned by the optical axis 43 and the reference direction 50, and extends through a center 39 of the image area 30. Furthermore, the reference direction 50 lies in the projection plane 120. Thus, the horizontal axis 121 shown in FIG. 1 and the vertical axis 122, which is likewise shown, also lie in the projection plane 120. The projection plane 120 intersects the image area 30 along the horizontal axis 121 so that the horizontal axis 121 forms an intersection line between the projection plane 120 and the image area 30.

In the spatial position of the image area 30 shown in FIG. 1, there is no rotation of the image area 30 about the optical axis 43. The horizontal axis 121 and the first center axis 41 of the image area 30 thereby coincide and the second center axis 42 of the image area 30 is tilted with respect to the vertical axis 122 by the tilt angle 54.

FIG. 9 shows the position of the image area 30 and the projection plane 120 for an angle of rotation 52 different from zero. The projection plane 120 intersects the image area 30 along the horizontal axis 121, wherein the horizontal axis 121 is rotated by the angle of rotation 52 about the optical axis 43 with respect to the first center axis 41 of the image area 30. Furthermore, the center axis 41 of the image area 30 is rotated by the angle of rotation 52 about the optical axis 43 with respect to a perpendicular projection 51 of the reference direction 50 onto the image area 30 or onto the image plane 40.

As likewise shown in FIG. 9, the projection center 125 has a spacing 126 from the center 39 of the image area 30. The spacing 126 is given by the focal length of the imaging optics 18, which is normalized to the diagonal of the image area 30, and corresponds to $$f_{normalized} \frac{f_{35\,mm}}{\sqrt{(24\,\text{mm})^2 + (36\,\text{mm})^2}},$$

where $f_{35mm}$ refers to the 35 mm equivalent focal length of the imaging optics 18.

The tilt angle 54 specifies the tilt of the image area 30 from the projection plane 120 about the horizontal axis 121, wherein the tilt angle 54, starting from the projection plane 120, is defined as positive for a right-handed rotation about the horizontal axis 121 and is defined as negative for a left-handed rotation about the horizontal axis 121. In the tilt shown in FIG. 9, the tilt angle 54 is negative.

The angle of rotation 52 specifies the rotation of a normal plane of the image area 30, which normal plane is defined by the second center axis 42 of the image area 30 and the optical axis 43, from the vertical plane, which is spanned by the reference direction 50 and the optical axis 43, about the optical axis 43, wherein the angle of rotation 52, starting from the vertical plane, is defined as positive for a right-handed rotation about the optical axis 43 and is defined as negative for a left-handed rotation about the optical axis 43. In the rotation shown in FIG. 9, the angle of rotation 52 is positive.

FIG. 10 shows a method 300 performed by the evaluation unit 20 for displaying the image section 60 in the user output interfaces 16, 17. The method 300 first comprises acquiring 305 the image data set 100 by means of the image sensor 12. Subsequently, the method 300 comprises detecting a spatial position of the image sensor 12 by means of the position sensor 14 and subsequently providing 315 the position data by the position sensor 14. The position data provided are then transmitted to the evaluation unit 12.

The evaluation unit 12 subsequently determines (320) a projective transformation by which the image area 30 is transformed onto the projection plane 120 shown in FIG. 8. The evaluation unit 12 in particular determines a spatial position of the projection plane 120 based on the tilt angle 54 and the angle of rotation 52.

In the following description, the sensor coordinate system is used whose X axis corresponds to the first center axis 41, whose Y axis corresponds to the second center axis 42, and whose Z axis corresponds to the optical axis 43. Furthermore, a reference coordinate system is used whose X axis corresponds to the horizontal axis 121, whose Y axis corresponds to the vertical axis 122, and whose Z axis corresponds to the longitudinal axis 123. Furthermore, homogeneous coordinates are used.

In the sensor coordinate system, a pixel within the image area 30 is then given in homogeneous coordinates by:

$$p_{\text{3d image point}} = (x, y, 0, 1)^T$$

In particular, the corner points of the image area 30 are given by:

$$P_{\text{3d image corners}} = \begin{bmatrix} x_{TL} & y_{TL} & 0 & 1 \\ x_{TR} & y_{TR} & 0 & 1 \\ x_{BR} & y_{BR} & 0 & 1 \\ x_{BL} & y_{BL} & 0 & 1 \end{bmatrix}^T.$$

where $x_{TL}$, $y_{TL}$ refer to the coordinates of a first corner point that has negative X and Y coordinates and that is located in the third quadrant of the X-Y plane of the sensor coordinate system, $x_{TR}$, $y_{TR}$ refer to the coordinates of a second corner point that has a positive X coordinate and a negative Y coordinate and that is located in the second quadrant of the X-Y plane of the sensor coordinate system, $x_{BR}$, $y_{BR}$ refer to the coordinates of a third corner point that has positive X and Y coordinates and that is located in the first quadrant of the X-Y plane of the sensor coordinate system, and $x_{BL}$, $y_{BL}$ refer to the coordinates of a fourth corner point that has a negative X coordinate and a positive Y coordinate and that is located in the fourth quadrant of the X-Y plane of the sensor coordinate system.

In the method 300 shown in FIG. 10, these corner points are first transformed (325) by means of the matrix transformation $$M_{\text{3d image} \to \text{3d world}} = R(\phi, \theta) = R_x(\phi) \cdot R_z(\theta)$$

into the reference coordinate system. The matrix transformation is composed of a first rotation matrix $$R_z(\theta) = \begin{bmatrix} \cos(\theta) & -\sin(\theta) & 0 & 0 \\ \sin(\theta) & \cos(\theta) & 0 & 0 \\ 0 & 0 & 1 & 0 \\ 0 & 0 & 0 & 1 \end{bmatrix}$$

and a subsequently applied second rotation matrix $$R_x(\phi) = \begin{bmatrix} 1 & 0 & 0 & 0 \\ 0 & \cos(\phi) & -\sin(\phi) & 0 \\ 0 & \sin(\phi) & \cos(\phi) & 0 \\ 0 & 0 & 0 & 1 \end{bmatrix}.$$

The first rotation matrix represents the rotation of the image area 30 about the optical axis 43, where θ corresponds to the angle of rotation 52. The second rotation matrix represents the tilt of the image area 30 about the horizontal axis 121, where corresponds to the tilt angle 54.

Subsequently, the projective transformation 330 shown in FIG. 8 of the corner points of the image area 30 onto the projection plane 120 takes place that is given by the X-Y plane of the reference coordinate system and in this regard accounts for both the tilt about the tilt angle 54 and the rotation about the angle of rotation 52. The projective transformation onto the X-Y plane of the respective coordinate system can be represented in matrix notation by $$P_{xy\text{-}plane} = \begin{bmatrix} 1 & 0 & \frac{d_x}{q} & 0 \\ 0 & 1 & \frac{d_y}{q} & 0 \\ 0 & 0 & 0 & 0 \\ 0 & 0 & \frac{1}{q} & 1 \end{bmatrix}; q = -d_z; d = (d_x, d_y, d_z)^T,$$

where d refers to the projection center 125 lying on the optical axis 43. In the sensor coordinate system, d is given by $$d_{sens} = (0, 0, -f_{normalized}, 1)^T$$

and in the reference coordinate system d is given by $$d_{ref} = R(\phi, \theta) \cdot (0, 0, -f_{normalized}, 1)^T$$

After applying the projection matrix, the coordinates determined by means of the projective transformation $P_{xy\text{-}plane}$ still have to be normalized by means of the fourth vector component in accordance with $$(x_p, y_p, 0, w_p)^T = P_{xy\text{-}plane} \cdot (x, y, z, 1)^T$$

$$(x_n, y_n, 0, 1)^T = \left( \frac{x_p}{w_p}, \frac{y_p}{w_p}, 0, 1 \right)^T.$$

Subsequently, the determination 340 of the image section 60 in the projection plane 120 takes place by defining four corners of the image section 60.

These corners of the image section 60 are then transformed (345) from the reference coordinate system back into the sensor coordinate system by means of the transformation $$M_{\text{3d world} \to \text{3d image}} = M_{\text{3d image} \to \text{3d world}}^{-1} = R(\phi, \theta)^{-1} = R(\phi, \theta)^T$$

that is inverse to the transformation $M_{\text{3d image} \to \text{3d world}}$.

If the image section 60 is to be displayed together with the untransformed scene 1 imaged onto the image area 30, a projective transformation 350 of the corner points by the projection center 125 onto the image plane 40, which corresponds to the X-Y plane of the sensor coordinate system, subsequently takes place in the sensor coordinate system. The corner points of the image section 60 transformed in this way are then displayed (390) together with the untransformed scene 1 imaged onto the image area 30.

FIG. 11 shows the image area 30 projected onto the projection plane 120 with the first corner point 35 in the third quadrant of the reference coordinate system, the second corner point 36 in the second quadrant of the reference coordinate system, the third corner point 37 in the first quadrant of the reference coordinate system, and the fourth corner point 38 in the fourth quadrant of the reference coordinate system. In this respect, the projected image area 30 is shown for a positive tilt angle 54 and a positive angle of rotation 52.

In addition to the image area 30, FIG. 11 shows a first image section 81, a second image section 82, and a third image section 83, wherein the respective image sections 81, 82, 83 lie completely within the image area 30 and form image sections that can be determined as the image section 60 by the evaluation unit 20. The respective image sections 81, 82, 83 are rectangular and have a respective first margin 61, a respective second margin 62, a respective third margin 63, and a respective fourth margin 64. The respective first margin 61 and the respective third margin 63 extend in parallel with the horizontal axis 121 and the respective second and fourth margins 62, 64 extend in parallel with the vertical axis 122. Furthermore, the image sections 81, 82, 83 have respective first center axes 75 aligned in parallel with the horizontal axis 121 and respective second center axes 76 aligned in parallel with the vertical axis 122.

The image sections 81, 82, 83 are each determined while maintaining a predefined aspect ratio. Furthermore, the respective image sections 81, 82, 83 are determined such that their respective second center axes 76 extend through the center 39 of the image area 30 projected onto the projection plane 120.

In addition, the first image section 81 is determined such that a center 85 of the first image section 81 corresponds to the center 39 of the image area 30. The second image section 82 is determined such that one of the margins 61, 63 of the second image section 82 extending in parallel with the horizontal axis 121 has the same spacing from the horizontal axis 121 as one of the corner points 35, 36, 37, 38 of the image area 30. For positive tilt angles 54, this is the corner point that is disposed closest to the horizontal axis 121 and that has a negative Y coordinate, i.e. the second corner point 36 in the projection shown in FIG. 11. For negative tilt angles 54, this is the corner point that is disposed closest to the horizontal axis 121 and that has a positive Y coordinate. Finally, the third image section 83 is determined such that at least two of its corners lie on a margin of the image area 30 and the area of the third image section 83 is maximized at the same time.

FIGS. 12 and 13 show a method 400 that is performed during the determination 340 of the image section 60 when the image section 60 is determined as the first image section 81. In this respect, starting from the center 39 of the image area 30, a first diagonal 77 and a second diagonal 78 of the first image section 81 are determined (405). The first diagonal 77 has a negative gradient in the X-Y plane of the reference coordinate system, the magnitude of said negative gradient corresponding to the inverse of the aspect ratio predefined for determining 340 the image section 60, and the second diagonal 78 has a positive gradient in the X-Y plane, the magnitude of said positive gradient likewise corresponding to the inverse of the predefined aspect ratio. The predefined aspect ratio is in this respect always defined as the extent of the image section 60 along the horizontal axis 121 to the extent of the image section 60 along the vertical axis 122.

Subsequently, a calculation 410 takes place of eight points of intersection 46 of the diagonals 77, 78 with a straight line extending through the first and second corner points 35, 36 and a first margin 31 of the image area 30, a straight line extending through the second and third corner points 36, 37 and a second margin 32 of the image area 30, a straight line extending through the third and fourth corner points 37, 38 and a third margin 33 of the image area 30, and a straight line extending through the fourth and first corner points 38, 35 and a fourth margin 34 of the image area 30. In FIG. 13, the point of intersection between the second diagonal 78 and the straight line extending through the first margin 31 is not shown.

The method 400 then comprises defining 415 the first image section 81. Here, that point of intersection 46 is determined which has a minimum spacing 47 from the center 39 of the image area 30. The corners of the first image section 81 are subsequently determined during the definition 415 of the first image section 81 such that they lie on the diagonals 77, 78 and their respective spacing from the center 39 of the image area 30 corresponds to the minimum spacing 47.

As shown in FIG. 14, at a tilt angle 54 of zero, the first image section 81 determined by the method 400 corresponds to the third image section 83. This means that at a tilt angle 54 of zero, the first image section 81 is also determined by the method 400 such that its second center axis 76 extends through the center 39 of the image area 30 and such that it comprises a maximum area within the image area 30 when the predefined aspect ratio is maintained. In this respect, two corners of the first image section 81 lie on the margins 31, 32, 33, 34 of the image area 30.

A method 500 of determining the second image section 82 is shown in FIGS. 15 and 16. In this respect, a check 505 for the presence of a negative tilt angle 54 takes place first. If a negative tilt angle 54 is present, an inversion 510 of the image area 30 projected onto the projection plane 120 along the vertical axis 122 takes place first. The first corner point 35 is thereby interchanged with the fourth corner point 38 and the second corner point 36 is interchanged with the third corner point 37 and it is ensured that the margin 31, 33 of the image area 30 extending through the second and third quadrants of the reference coordinate system has a greater extent along the center axis 121 than the margin 31, 33 of the image area 30 extending through the first and fourth quadrants.

Subsequently, a center 74 of the first margin 61 of the second image section 82 aligned in parallel with the horizontal axis 121 is determined (515) such that it lies along the vertical axis 122 at the same height as the corner point 35, 36 of the image area 30 in the second and third quadrants of the reference coordinate system that is disposed closest to the center axis 121. In the spatial position of the image sensor 12 shown in FIG. 16, this is the second corner point 36.

Subsequently, the method 500 comprises determining 520 points of intersection 46 between a first diagonal 72 and straight lines extending through the second, third, and fourth margins 32, 33, 34 of the image area 30, and points of intersection 46 between a second diagonal 73 and the straight lines extending through the second, third, and fourth margins 32, 33, 34 of the image area 30. In alternative embodiments, only the points of intersection 46 between the first diagonal 72 and the straight lines extending through the third and fourth margins 33, 34 of the image area 30 and/or only the points of intersection 46 between the second diagonal 73 and the straight lines extending through the second and third margins 32, 33 of the image area 30 can also be determined.

The respective diagonals 72, 73 are diagonals of halves 70 of the second image section 82 separated by the second center axis 76 of the second image section 82 and the respective diagonals 72, 73 each extend through the center 74. The first diagonal 72 has a negative gradient and the second diagonal 73 has a positive gradient, wherein a magnitude of the respective gradients corresponds to twice the inverse of the predefined aspect ratio.

Subsequently, a definition 525 of the second image section 82 takes place by determining that point of intersection 46 which has a minimum spacing 47 from the center 74 and by calculating the position of the corners of the second image section 82 from the minimum spacing 47 and from the predefined aspect ratio.

Subsequently, if a negative tilt angle 54 has been determined, an inversion 590 of the defined image section 82 along the vertical axis 122 takes place to compensate the inversion 510 of the projected image area 30 that took place at the start of the method 500.

In the method 600, the same algorithm for determining the second image section 82 is therefore used for both positive and negative tilt angles 54, wherein this algorithm comprises the method steps 515, 520, 525 performed between the initial and final inversion 510, 590. In alternative embodiments, the inversion 510, 590 can also be performed when a positive tilt angle 54 is determined, wherein the method steps 515, 520, 525 are then adapted such that the center 74 lies on the third margin 63 of the second image section 82 extending through the first and fourth quadrants of the reference coordinate system.

As shown in FIG. 17, at an angle of rotation 52 of zero, the second image section 82 determined by the method 500 corresponds to the third image section 83. This means that at an angle of rotation 52 of zero, the second image section 82 determined by the method 500 is, like the third image section 83, determined such that its second center axis 76 extends through the center 39 of the image area 30 and such that it comprises a maximum area within the image area 30 when the predefined aspect ratio is maintained. In this respect, two corners of the second image section 82 lie on the margins 31, 32, 33, 34 of the image area 30. Unlike in the first image section 81, the center 85 of the second image section 82, however, does not correspond to the center 39 of the image area 30.

FIG. 18 shows a graphical representation of a method of determining the third image section 83. The method first comprises calculating a point of intersection A of the first margin 31 of the image area 30 projected onto the projection plane 120 with the vertical axis 122 and calculating a point of intersection E of the third margin 33 of the projected image area 30 with the vertical axis 122. Subsequently, an evaluation range for determining the third image section 83 is narrowed down to Y coordinate values between the points of intersection A and E.

Subsequently, margin functions $f_{top}(y)$, $f_{right}(y)$, $f_{bottom}(y)$ and $f_{left}(y)$ are defined, where $f_{top}(y)$ specifies the dependence of the X coordinates of the first margin 31, $f_{right}(y)$ specifies the dependence of the X coordinates of the second margin 32, $f_{bottom}(y)$ specifies the dependence of the X coordinates of the third margin 33 and $f_{left}(y)$ specifies the dependence of the X coordinates of the fourth margin 34 of the image area 30 on the Y coordinates. For the further calculation, the absolute values of the functions $f_{top}(y)$, $f_{right}(y)$, $f_{bottom}(y)$ and $f_{left}(y)$ are then used, which corresponds to a mirroring of the sections of the margins 31, 32, 33, 34 of the image area 30 extending in the third and fourth quadrants of the reference coordinate system at the vertical axis 122, and the sectionally defined function $h(y)=\min(|f_{top}(y)|,|f_{right}(y)|,|f_{bottom}(y)|,|f_{left}(y)|)$ is used.

In an evaluation range along the X axis in the interval $[0,x_{max}]$, where $x_{max}=\max(h(y))$, the X coordinate value x of a straight line extending in parallel with the vertical axis 122 is then determined to which the following applies:

$$\frac{SV}{2} = \frac{x}{L},$$

where SV refers to the predefined aspect ratio and L refers to the length of a line segment extending in parallel with the vertical axis 122 under the function $h(y)$.

FIG. 19 shows a further method 600 of determining the third image section 83. In the method 600, it is first checked (605) whether a negative tilt angle 54 is present. If this is the case, the inversion 510 of the projected image area 30 along the vertical axis 122 described in connection with FIG. 15 takes place first. The points of intersection A and E are subsequently determined (615) as described above. If no negative tilt angle 54 is present, the method 600 starts directly with the determination 615 of the points of intersection A and E.

The further points of intersection B, C, and D shown in FIG. 18 are then determined (620). The method shown in FIG. 20 is used for this purpose. In this respect, it is first checked (626) whether a Y coordinate of the first corner point 35 of the image area 30 is smaller than a Y coordinate of the second corner point 36. If this is the case, the point of intersection B is determined (628) as the point of intersection between the first margin 31 and the fourth margin 34 of the projected image area 30 mirrored at the vertical axis 122, as shown in FIG. 18. Otherwise, the point of intersection B is determined (629) as the point of intersection between the first margin 31 mirrored at the vertical axis 122 and the second margin 32 of the projected image area 30.

Subsequently, the method 620 comprises determining (630) the point of intersection C as the point of intersection of the second margin 32 or of the fourth margin 34, which is mirrored at the vertical axis 122, with the horizontal axis 121. Thereafter, it is checked (632) whether a Y coordinate of the fourth corner point 38 of the projected image area 30 is smaller than a Y coordinate of the third corner point 37 of the projected image area 30. If this is the case, the point of intersection D is determined (634) as the point of intersection between the third margin 33 mirrored at the vertical axis 122 and the second margin 32 of the projected image area 30, as shown in FIG. 18. Otherwise, the point of intersection D is determined (635) as the point of intersection between the third margin 33 and the fourth margin 34 of the projected image area 30 mirrored at the vertical axis 122.

The further method 600 of determining the third image section 83 shown in FIG. 19 then comprises defining 650 a first point of intersection P1 shown in FIG. 21 and a second point of intersection P2 likewise shown in FIG. 21 that delimit that line segment of the margins 31, 32, 33, 34 of the projected image area 30 which intersects the third corner 67 of the third image section 83 to be determined.

The defining 650 is shown in FIG. 22 and comprises first determining 652 a point of intersection F, shown in FIG. 21, of the first margin 31 of the projected image area 30 with a straight line extending in parallel with the vertical axis 122 through the point of intersection C. Subsequently, the defining 650 comprises determining 654 a point of intersection G, also shown in FIG. 21, of the first margin 31 with a straight line extending in parallel with the vertical axis 122 through the point of intersection D.

The connection line CF is then compared (656) with the predefined aspect ratio. If the ratio of twice the X coordinate value of the point of intersection F and the length of the connection line CF is not greater than the predefined aspect ratio, the first point of intersection P1 is defined as the point of intersection B and the second point of intersection P2 is defined (657) as the point of intersection C. Otherwise, the connection line DG is compared (658) with the predefined aspect ratio. If the ratio of twice the X coordinate value of the point of intersection G and the length of the connection line DG is greater than the predefined aspect ratio, the first point of intersection P1 is defined as the point of intersection C and the second point of intersection P2 is defined (660) as the point of intersection D, which is shown in FIG. 21. Otherwise, the first point of intersection P1 is defined as the point of intersection D and the second point of intersection P2 is defined (661) as the point of intersection E.

Subsequently, a point of intersection K between a straight line extending through the points of intersection A and B and a straight line extending through the points of intersection P1 and P2 and a point of intersection L of the straight line extending through the points of intersection P1 and P2 with the vertical axis 122 are determined (662), as shown in FIG. 23. In this respect, the relative length ratios of the representation in FIG. 23 differ from the length ratios shown in FIGS. 18 and 21.

The defining 650 then comprises determining 664 dimensions of a triangle defined by the points of intersection A, K, and L. Here, the lengths a, b, and c shown in FIG. 23 are determined from the coordinates of the points of intersection A, K, and L. In this respect, the length a corresponds to the difference of the Y coordinate values of the points A and K, the length b corresponds to the difference of the Y coordinate values of the points K and L, and the length c corresponds to the spacing of the point K from the vertical axis 122 forming the Y axis.

Subsequently, the angles γ and δ are determined as $\tan(\gamma)=a/c$ $\tan(\delta)=b/c.$ The method 600 then comprises determining 666 the position and dimensions of the third image section 83. In this respect, an X coordinate value g of the second margin 62 of the third image section 83 is calculated first. Since the predefined aspect ratio is given by $$r = \frac{2 \cdot g}{d+e},$$

where d=f·tan(γ) and e=f·tan(δ) and f=c-g further applies, the X coordinate value g can be calculated as:

$$g = c - \frac{2c}{r\tan(\delta) + r\tan(\gamma) + 2} = c\left(1 - \frac{2}{r\tan(\delta) + r\tan(\gamma) + 2}\right).$$

A width w of the third image section 83 along the horizontal axis 121 then amounts to w=2·g and a height h along the vertical axis 122 amounts to h=d+e. The Y coordinate of the center 85 of the third image section 83 furthermore amounts to K.y+(e-d)/2 with the Y coordinate K.y of the point of intersection K, while the X coordinate of the center 85 of the third image section 83 is equal to zero.

As shown in FIG. 19, the corners 65, 66, 67, 68 of the third image section 83 shown in FIG. 18 are then calculated (685) from the position and the dimensions of the third image section 83. Finally, in the cases in which a negative tilt angle 54 is present, the position of the corners 65, 66, 67, 68 of the determined image section 83 is inverted (590) along the vertical axis 122 to compensate the inversion 510 of the corner points 35, 36, 37, 38 of the image area 30 that took place at the start of the method 600.

In the method 600, the same algorithm for determining the third image section 83 is therefore also used for both positive and negative tilt angles 54, wherein this algorithm comprises the method steps 615, 620, 650, 685 performed between the initial and final inversion 510, 590. In alternative embodiments, the inversion 510, 590 can also be performed when a positive tilt angle 54 is determined, wherein the method steps 615, 620, 650, 685 then have to be adapted accordingly.

FIG. 24 shows a further method 700 by which the determination 340 of the image section 60 can be performed. In this respect, the image section 60, as in the method 600, is determined such that it has the predefined aspect ratio, its second center axis 76 extends through the projected center 39 of the image area 30, and it has a maximum area within the image area 30 projected onto the projection surface 120. In the method 700, the image section 60 is in particular also determined such that at least two of its corners 65, 66, 67, 68 lie on margins 31, 32, 33, 34 of the projected image area 30.

The further method 700 first comprises checking 705 the tilt angle 54. If the tilt angle 54 deviates from zero by at most a threshold value, in particular if the tilt angle 54 is equal to zero, the image section 60 is determined by the method 400 described in connection with FIGS. 12 to 14. The image section 60 can thereby be determined with particularly little effort compared to the other methods 500, 600, wherein it is likewise determined as a maximum image section having a predefined aspect ratio and having a second center axis 76 extending through the center 39 of the image area 30, cf. FIG. 14. Otherwise, if a negative tilt angle 54 is present, the inversion 510 of the projected image area 30 along the vertical axis 122 takes place. With a positive tilt angle 54, the inversion 510 is omitted.

A checking 710 of the angle of rotation 52 then takes place. If the angle of rotation 52 differs from zero by at most a further threshold value, in particular if the angle of rotation 52 is equal to zero, the image section 60 is calculated by means of the method steps 515, 520, 525 of the method 500 described in connection with FIGS. 15 to 17. The computing effort for determining the image section 60 is likewise less than in the method 600. As is shown in FIG. 17, in this case the determined image section 60 also corresponds to the third image section 83 of a maximum area that can be determined by the method 600.

If the checking 710 of the angle of rotation 52 reveals that the angle of rotation 52 deviates from zero by more than the further threshold value, the image section 60 is calculated by means of the method steps 620, 650, 685 of the method 600. Finally, in the cases in which the tilt angle 54 deviates from zero by more than the threshold value and a negative tilt angle 52 is present, the inversion 590 of the determined image section 60 takes place.

In alternative embodiments of the image recording device 10, the image section 60 can also be determined semi-automatically based on a center 85 of the image section 60 that can be predefined by a user of the image recording device 10. Alternatively or additionally, the predetermined aspect ratio can also be predefinable by a user input. Furthermore, in alternative embodiments of the image recording device 10, the image section 60 can also be determined such that it comprises regions disposed outside the projected image area 30 in the projection plane 120. In these cases, the evaluation unit 20 can be configured to fill the regions disposed outside the projected image area 30 with calculated image information, for example, interpolated image information.

The evaluation unit 20 is furthermore configured to store reference data for a perspective correction of the recorded image data set 100 in the memory unit 22. The reference data can in this respect be stored separately from the image data set 100 in a separate file or also together with the image data set 100 in a common file, for example as metadata. The reference data can, for example, comprise the tilt angle 54 and/or the angle of rotation 52 and/or a focal length, for example a normalized focal length, for instance a focal length normalized to a 35 mm format, of the imaging optics 18. Alternatively or additionally, the reference data can comprise image section data that define the position and size of the image section 60.

Such image section data can inter alia comprise the positions of the corners 65, 66, 67, 68 of the image section 60 and/or the predefined aspect ratio and/or a relative size of the corrected image with respect to the image data set 100. In this respect, the positions of the corners 65, 66, 67, 68 can, for example, be stored in a normalized form as numerical values between 0 and 1, the predefined aspect ratio can be stored as a ratio of width to height, and the relative size can be stored as a ratio of a height of the image data set 100 to a height of the corrected image. Furthermore, the reference data can comprise information that specifies whether the stored image data set 100 has already been corrected by means of the projective transformation, or not.

REFERENCE NUMERAL LIST 1 scene
2 building
10 image recording device
11 housing
12 image sensor
14 position sensor
15 gravitational acceleration
16 first user output interface
17 second user output interface
18 imaging optics
20 evaluation unit
22 memory unit
30 image area
31 first margin
32 second margin
33 third margin
34 fourth margin
35 first corner point
36 second corner point
37 third corner point
38 fourth corner point
39 center
40 image plane
41 first center axis
42 second center axis
43 optical axis
46 point of intersection
47 spacing
50 reference direction
51 projection
52 angle of rotation
54 tilt angle
60 image section
61 first margin
62 second margin
63 third margin
64 fourth margin
65 first corner
66 second corner
67 third corner
68 fourth corner
69 diagonal
70 half
72 first diagonal
73 second diagonal
74 center
75 first center axis
76 second center axis
77 first diagonal
78 second diagonal
81 first image section
82 second image section
83 third image section
85 center
86 first point of intersection
87 second point of intersection
91 first measurement point
92 second measurement point
100 image data set
105 edges
111 upper side
112 lower side
113 right side
114 left side
115 first position
116 second position
117 third position
118 fourth position
120 projection plane
121 horizontal axis
122 vertical axis
123 longitudinal axis
125 projection center
126 spacing
127 vertical plane
130 mirrored image area
300 method
305 acquiring an image data set
310 detecting a spatial position
315 providing position data
320 determining a projective transformation
325 coordinate transformation of the image corners into reference coordinates
330 projection of the image corners onto the projection plane
340 determining an image section
345 back transformation of corners of the image section into sensor coordinates
350 back projection of the section corners onto the image plane
390 displaying the image data set and the image section
400 method of determining a first image section
405 determining diagonals
410 calculating points of intersection
415 defining the first image section
500 method of determining a second image section
505 checking for negative tilt angles
510 inverting the projected image area
515 determining a center
520 determining points of intersection
525 defining the second image section
590 inverting the image section
600 method of determining a third image section
605 checking for negative tilt angles
615 determining a center
620 determining points of intersection B, C, D 626 comparing Y coordinates of a first and second corner point
628 determining a point of intersection B
629 determining a point of intersection B
630 determining a point of intersection C
632 comparing Y coordinates of a third and fourth corner point
634 determining a point of intersection D
635 determining a point of intersection D
650 defining points of intersection P1 and P2
652 determining a point of intersection F
654 determining a point of intersection G
656 comparing a connection line CF with the predefined aspect ratio
657 defining the point of intersection P1 as the point of intersection B and the point of intersection P2 as the point of intersection C
658 comparing a connection line DG with the predefined aspect ratio
660 defining the point of intersection P1 as the point of intersection C and the point of intersection P2 as the point of intersection D
661 defining the point of intersection P1 as the point of intersection D and the point of intersection P2 as the point of intersection E
662 determining points of intersection K and L
664 determining dimensions of a triangle
666 determining the position and dimensions of the third image section
685 calculating corners of the image section
700 method of determining an image section
705 checking the tilt angle
710 checking the angle of rotation

The invention claimed is:

1. An image recording device comprising an optoelectronic image sensor, a position sensor, a graphical user output interface, and an evaluation unit,
wherein the image sensor is configured to acquire an image data set that represents an imaging of a scene located in front of the image sensor onto an image area of the image sensor,
wherein the position sensor is configured to detect a spatial position of the image area relative to a reference direction and to provide position data that specify both an angle of rotation, by which the image area is rotated about an optical axis of the image sensor on the acquisition of the image data set, and a tilt angle by which the image area is tilted about a horizontal axis on the acquisition of the image data set,
wherein the horizontal axis is oriented perpendicular to the optical axis and perpendicular to the reference direction,
wherein the evaluation unit is configured to determine, from the position data, a projective transformation that maps the image data set onto a projection plane in dependence on both the rotation and the tilt from the image area,
wherein the projection plane is tilted with respect to the image area in dependence on the tilt angle and intersects the image area along an intersection line that is rotated in the image area with respect to center axes of the image area in dependence on the angle of rotation,
wherein the evaluation unit is configured to determine an image section in the projection plane for the image data set mapped onto the projection plane by means of the projective transformation,
wherein the evaluation unit is configured to display the image section simultaneously with at least a region of the scene imaged onto the image area that lies within the image section in the graphical user output interface.

2. The image recording device in accordance with claim 1,
wherein the evaluation unit is configured to determine the image section, such that, in the projection plane, a first center axis of the image section extends in parallel with the horizontal axis and a second center axis of the image section oriented perpendicular to the first center axis extends in parallel with the reference direction.

3. The image recording device in accordance with claim 1,
wherein the evaluation unit is configured to determine the image section such that, when a predefined aspect ratio is maintained, at least two corners of the image section lie on margins of the image area that are mapped onto the projection plane by means of the projective transformation.

4. The image recording device in accordance with claim 1,
wherein the evaluation unit is configured to determine the image section independently of the position of the image sensor such that a center of the image area projected onto the projection plane by means of the projective transformation lies on a center axis of the image section.

5. The image recording device in accordance with claim 1,
wherein the evaluation unit is configured, at least when the tilt angle is equal to zero, to determine a corner of the image section in the projection plane as a point of intersection of a diagonal of the image section, which diagonal is predefined by an aspect ratio, with a margin of the image area projected onto the projection plane.

6. The image recording device in accordance with claim 1,
wherein the evaluation unit is configured, at least when the tilt angle differs from zero by at least a threshold value and the angle of rotation is equal to zero, to determine a corner of the image section in the projection plane as a point of intersection of a diagonal of one half of the image section, which diagonal is predefined by an aspect ratio, with a margin of the image area projected onto the projection plane,
wherein, in the projection plane, the diagonal extends through a center of a further margin of the image section aligned in parallel with the horizontal axis.

7. The image recording device in accordance with claim 1,
wherein a projection center of the projective transformation is arranged on the optical axis.

8. The image recording device in accordance with claim 7,
wherein a spacing of the projection center from the image area corresponds to a focal length, normalized to a diagonal of the image area, of an imaging optics of the image recording device imaging the scene onto the image sensor.

9. The image recording device in accordance with claim 1,
wherein the evaluation unit is configured to only use corner points of the image area projected onto the projection plane for the determination of the image section.

10. The image recording device in accordance with claim 1,
wherein the evaluation unit is configured to determine the image section based on a predefined aspect ratio.

11. The image recording device in accordance with claim 10,
wherein the predefined aspect ratio is different from an aspect ratio of the image sensor and/or of the user output interface.

12. The image recording device in accordance with claim 10,
wherein the evaluation unit is configured to receive a user input for specifying the predefined aspect ratio via a user input interface.

13. The image recording device in accordance with claim 1,
wherein the evaluation unit is configured to display the region of the scene imaged onto the image area that lies within the image section in the graphical user output interface as a region of the image data set that is transformed into the projection plane by means of the projective transformation,
wherein the evaluation unit is configured to display the image section by cropping the transformed image data set.

14. The image recording device in accordance with claim 1,
wherein the evaluation unit is configured to display the scene imaged onto the image area completely and without using the projective transformation in the graphical user output interface,
wherein the evaluation unit is configured to display the image section by means of a frame superposed on the imaged scene.

15. The image recording device in accordance with claim 14,
wherein the evaluation unit is configured to display a position of a measurement point for determining a recording parameter of the image recording device in the user output interface,
wherein the position of the measurement point is displayed relative to the complete and untransformed scene imaged onto the image area.

16. The image recording device in accordance with claim 15,
wherein the image recording device comprises a combined user interface that comprises the user output interface and a superposed position input interface for defining the position of the measurement point relative to the untransformed scene.

17. The image recording device in accordance with claim 16,
wherein the combined user interface is configured to detect the position of the measurement point as that position within the untransformed scene at which an actuation of the superposed position input interface is detected.

18. The image recording device in accordance with claim 1,
wherein the reference direction lies in the projection plane, or wherein the projection plane is tilted with respect to the reference direction by a residual angle, the residual angle is different from zero and has a smaller magnitude than the tilt angle.

19. The image recording device in accordance with claim 1,
wherein the image sensor is configured to acquire a sequence of image data sets that represent the scene imaged onto the image area at consecutive points in time,
wherein the position sensor is configured to detect a respective spatial position of the image sensor for each image data set and to provide respective position data,
wherein the evaluation unit is configured to determine a respective image section for each image data set projected onto a respective projection plane by means of a projective transformation determined from the respective position data,
wherein the evaluation unit is configured to successively display the respective image sections at least together with the region of the scene imaged onto the image area that lies within the respective image section in the graphical user output interface.

20. A method of operating an image recording device, wherein the method comprises:
acquiring an image data set using an image sensor of the image recording device,
wherein the image data set represents an imaging of a scene located in front of the image sensor onto an image area of the image sensor;
detecting a spatial position of the image area relative to a reference direction;
providing position data that specify both an angle of rotation, by which the image area is rotated about an optical axis of the image sensor on the acquisition of the image data set, and a tilt angle by which the image area is tilted about a horizontal axis on the acquisition of the image data set,
wherein the horizontal axis is oriented perpendicular to the optical axis and perpendicular to the reference direction;
determining a projective transformation from the position data, wherein the projective transformation maps the image data set onto a projection plane in dependence on both the rotation and the tilt from the image area,
wherein the projection plane is tilted with respect to the image area about the horizontal axis in dependence on the tilt angle and intersects the image area along an intersection line that is rotated in the image area with respect to center axes of the image area in dependence on the angle of rotation;
determining an image section in the projection plane for the image data set mapped onto the projection plane by means of the projective transformation;
displaying the image section and at least a region of the scene imaged onto the image area that lies within the image section in a graphical user output interface of the image recording device.

* * * * *